United States Patent
Ichikawa et al.

(10) Patent No.: US 8,424,854 B2
(45) Date of Patent: Apr. 23, 2013

(54) FLUID-FILLED TYPE VIBRATION DAMPING DEVICE

(75) Inventors: Hiroyuki Ichikawa, Kani (JP); Yuichi Ogawa, Kasugai (JP); Naoki Furumachi, Kasugai (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 336 days.

(21) Appl. No.: 12/865,970

(22) PCT Filed: Nov. 4, 2009

(86) PCT No.: PCT/JP2009/005860
§ 371 (c)(1),
(2), (4) Date: Aug. 3, 2010

(87) PCT Pub. No.: WO2010/073462
PCT Pub. Date: Jul. 1, 2010

(65) Prior Publication Data
US 2011/0006466 A1    Jan. 13, 2011

(30) Foreign Application Priority Data

Dec. 25, 2008 (JP) ................. 2008-331150

(51) Int. Cl.
*F16F 5/00* (2006.01)
(52) U.S. Cl.
USPC .................................... 267/140.13
(58) Field of Classification Search .......... 267/292, 267/293, 140.11, 140.13, 140.3, 140.4, 141, 267/141.2
See application file for complete search history.

(56) References Cited

U.S. PATENT DOCUMENTS

| | | | |
|---|---|---|---|
| 4,420,060 A * | 12/1983 | Kakimoto | 180/300 |
| 4,572,490 A * | 2/1986 | Alciati | 267/140.11 |
| 4,679,779 A * | 7/1987 | Hodonsky | 267/140.13 |
| 4,697,793 A * | 10/1987 | Reuter et al. | 267/195 |
| 4,986,510 A * | 1/1991 | Bellamy et al. | 267/140.13 |
| 6,536,113 B2 * | 3/2003 | Guillemot | 29/896.93 |

(Continued)

FOREIGN PATENT DOCUMENTS

| | | |
|---|---|---|
| JP | A-60-11744 | 1/1985 |
| JP | U-4-63841 | 5/1992 |

(Continued)

OTHER PUBLICATIONS

International Search Report in PCT/JP2009/005860 dated Dec. 1, 2009.

(Continued)

*Primary Examiner* — Bradley King
*Assistant Examiner* — Nicholas J Lane
(74) *Attorney, Agent, or Firm* — Oliff & Berridge, PLC

(57) ABSTRACT

A fluid-filled type vibration damping device wherein a low-frequency orifice passage and at least one high-frequency orifice passage are formed in a partition member, which is supported by a second mounting member; a valve body is disposed at least at one opening of the high-frequency orifice passage and is provided with a spring member that in a non-loaded state positions the valve body away from the opening of the high-frequency orifice passage to hold the high-frequency orifice passage in an open state; and, at times of vibration input, the valve body is adapted to block the high-frequency orifice passage in opposition to a holding force of the spring member.

9 Claims, 7 Drawing Sheets

U.S. PATENT DOCUMENTS

| | | | |
|---|---|---|---|
| 7,306,210 B2 * | 12/2007 | Happou et al. | 267/140.13 |
| 2007/0085249 A1 * | 4/2007 | Happou et al. | 267/140.13 |
| 2007/0090579 A1 * | 4/2007 | Noe | 267/140.13 |
| 2009/0001639 A1 * | 1/2009 | Muraoka et al. | 267/140.13 |
| 2010/0213652 A1 * | 8/2010 | Ichikawa et al. | 267/140.13 |
| 2012/0018935 A1 * | 1/2012 | Ogasawara | 267/140.13 |

FOREIGN PATENT DOCUMENTS

| | | |
|---|---|---|
| JP | A-9-89041 | 3/1997 |
| JP | A-9-144805 | 6/1997 |
| JP | B2-3035233 | 4/2000 |
| JP | A-2008-215529 | 9/2008 |

OTHER PUBLICATIONS

International Preliminary Report on Patentability issued in International Application No. PCT/JP2009/005860.

Dec. 28, 2012 Chinese Office Action issued in Chinese Patent Application No. 200980152597.9 (with partial translation).

* cited by examiner

FLUID-FILLED TYPE VIBRATION DAMPING DEVICE

TECHNICAL FIELD

The present invention relates to a vibration damping device intended for example to be implemented in an automotive engine mount, and relates in particular to a fluid-filled type vibration damping device adapted to utilize damping effect based on flow action of a fluid filling the interior.

BACKGROUND ART

Vibration damping devices designed for installation between components making up a vibration transmission system, such as the power unit and the vehicle body of an automobile, in order to provide vibration-damped coupling and vibration-damped support between the components, are known in the art. Such vibration damping devices have a construction whereby a first mounting fitting attached to one component of the vibration transmission system and a second mounting fitting attached to the other component of the vibration transmission system are elastically linked by a main rubber elastic body. Fluid-filled type vibration damping devices, which utilize the flow action of a noncompressible fluid filling the interior, have been proposed as one class of vibration damping device. A typical fluid-filled type vibration damping device has a construction that includes a pressure-receiving chamber whose wall is partially constituted by the main rubber elastic body and an equilibrium chamber whose wall is partially constituted by a flexible film, with the pressure-receiving chamber and the equilibrium chamber communicating with one another through an orifice passage.

One problem encountered with fluid-filled type vibration damping devices is that whereas vibration damping action based on resonance action of the fluid is excellent for vibration at frequencies to which the orifice passage has been pre-tuned, it is difficult to achieve effective vibration damping action against vibration at frequencies lying outside the tuning frequency of the orifice passage. In particular, at times of input of vibration of higher frequency range than the tuning frequency of the orifice passage, the orifice passage becomes substantially blocked due to antiresonance action, creating a problem of markedly degraded vibration damping capabilities resulting from a high dynamic spring rate.

With the aim of achieving reductions in dynamic spring arising at times of input of vibration of a high frequency range, there has been proposed a fluid-filled type vibration damping device that features arranging a moveable plate on a partition member separating the pressure-receiving chamber from the equilibrium chamber, to provide a fluid pressure-absorbing mechanism that utilizes minute displacement of the moveable plate. The vibration damping device is designed to accommodate the moveable plate arranged so as to be capable of minute displacement with respect to a housing (partition member), with pressure of the pressure-receiving chamber exerted on one face of the moveable plate, while pressure of the equilibrium chamber is exerted on the other face. At times of vibration input, the moveable plate experiences minute displacement along the direction of plate thickness due to relative pressure fluctuations between the pressure-receiving chamber and the equilibrium chamber, so that liquid pressure of the pressure-receiving chamber is dispelled into the equilibrium chamber, attaining a low dynamic spring rate in the pressure-receiving chamber. One such fluid-filled type vibration damping device is that disclosed in Patent Citation 1 for example.

However, the fluid-filled type vibration damping device disclosed in Patent Citation 1 has the problem that because the moveable plate is accommodated in a rigid housing (partition member), minute displacement of the moveable plate along its thickness direction gives rise to noise caused by striking against the partition member. Striking noise of the moveable plate is a particular problem in Patent Citation 1, because the moveable plate is arranged across a gap lying in the direction of plate thickness with respect to the housing.

PRIOR ART DOCUMENT

Patent Citation

Patent Citation 1: JP-B-3035233

SUMMARY OF THE INVENTION

Problem the Invention Attempts to Solve

With the foregoing in view, it is accordingly an object of the present invention to provide a fluid-filled type vibration damping device of novel construction able to afford effective vibration damping action at times of input of vibration of higher frequency than the tuning frequency of a low-frequency orifice passage; as well as to prevent noise arising from operation of the vibration damping device in response to high-frequency vibration.

Means for Solving the Problem

Specifically, a first mode of the present invention provides a fluid-filled type vibration damping device comprising: a first mounting member and a second mounting member connected by a main rubber elastic body; a pressure-receiving chamber whose wall is partially constituted by the main rubber elastic body, and an equilibrium chamber whose wall is partially constituted by a flexible film, the pressure-receiving chamber and the equilibrium chamber being filled with a noncompressible fluid, and the pressure-receiving chamber and the equilibrium chamber communicating with one another through orifice passages; the device being characterized in that: a partition member that partitions the pressure-receiving chamber and the equilibrium chamber is supported by the second mounting member; the orifice passages includes a low-frequency orifice passage and at least one high-frequency orifice passage tuned to higher frequency than the low-frequency orifice passage, which are formed in the partition member; a valve body is disposed at least at one opening of the high-frequency orifice passage, and is provided with a spring member that in a nonloaded state positions the valve body away from the opening of the high-frequency orifice passage to hold the high-frequency orifice passage in an open state; and on a basis of relative pressure fluctuations arising between the pressure-receiving chamber and the equilibrium chamber the valve body is urged closer to the opening of the high-frequency orifice passage in opposition to a holding force of the spring member so as to block the high-frequency orifice passage.

The fluid-filled type vibration damping device constructed according to the present invention includes both a low-frequency orifice passage and a high-frequency orifice passage, making it possible to exhibit vibration damping action on the basis of flow action of fluid against vibration over a wider frequency range. Additionally, by switching the high-frequency orifice passage between the open state and the blocked state with the valve body, it is possible to assure ample fluid flow levels through the low-frequency orifice passage, which has high flow resistance, so that effective vibration damping action can be produced by the low-frequency orifice passage.

In the fluid-filled type vibration damping device constructed according to the present mode, the valve body is elastically supported by the spring member; and in the non-loaded state in the absence of deformation of the spring member induced by an outside force, the high-frequency orifice passage is held in the open state. At this point, if relative pressure fluctuations arise between the pressure-receiving chamber and the equilibrium chamber so as to bring about displacement of the valve body due to the action of fluid pressure, the level of deformation of the spring member will increase in response to the increasing level of displacement of the valve body. Urging force exerted on the valve body in the direction opposite the displacement direction based on the elasticity of the spring member increases in association with increasing deformation of the spring member. As a result, as the valve body moves closer to the opening of the high-frequency orifice passage, the rate of displacement of the valve body progressively declines, thereby minimizing impact force produced when the valve body strikes against the opening of the high-frequency orifice passage. For this reason, noise caused by impact force due to striking of the valve body can be minimized or prevented.

The high-frequency orifice passage may be tuned to any frequency higher than that of the low-frequency orifice passage. For example, the low-frequency orifice passage may be tuned to low frequency, and the high-frequency orifice passage may be tuned to midrange frequency.

A second mode of the present invention provides a fluid-filled type vibration damping device according to the first mode wherein the valve body and the spring member are integrally composed by a valve-like rubber projection that is formed projecting towards at least one of a pressure-receiving chamber end and an equilibrium chamber end in the opening of the high-frequency orifice passage.

According to the second mode, because the valve body is formed by a rubber elastic body, noise produced by the valve body striking the opening of the high-frequency orifice passage can be reduced through cushioning action of the valve body itself.

Additionally, because the valve body and the spring member are integrally formed by the valve-like rubber projection, the number of parts can be kept to a minimum. Moreover, because the spring member is formed by a rubber elastic body, attenuation arising from elastic deformation of the spring member is effectively realized, and the speed of the valve body when it strikes the opening of the high-frequency orifice passage can be more effectively reduced so that noise can be prevented.

A third mode of the present invention provides a fluid-filled type vibration damping device according to the second mode wherein the partition member includes a passage hole connecting the pressure-receiving chamber and the equilibrium chamber, while supporting a passage-defining rubber part adapted to block the passage hole; the passage-defining rubber part has a communication hole connecting the pressure-receiving chamber with the equilibrium chamber through the passage hole so that the high-frequency orifice passage is constituted by the communication hole; and the valve-like rubber projection is integrally formed with the passage-defining rubber part at a rim of opening of the communication hole.

According to the third mode, because a communication hole formed in a passage-defining rubber part is incorporated to form the high-frequency orifice passage, passage-defining rubber parts furnished with communication holes of differing length and cross-sectional area can be employed to easily implement fluid-filled type vibration damping devices having different vibration damping characteristics but having identical construction overall.

Additionally, by integrally forming the valve-like rubber projection with the passage-defining rubber part, the valve-like rubber projection can be easily positioned at the rim of the opening of the communication hole. Also, by supporting the passage-defining rubber part on the partition member, the valve-like rubber projection can be easily held positioned in a prescribed orientation in which it projects towards the pressure-receiving chamber end or the equilibrium chamber end.

A fourth mode of the present invention provides a fluid-filled type vibration damping device according to the second or third mode wherein provided is a restricting abutment portion adapted to restrict elastic deformation of the valve-like rubber projection to an opposite side from a direction closer towards the opening of the high-frequency orifice passage.

According to the fourth mode, it is possible to limit the direction of elastic deformation of the valve-like rubber projection to the direction closer towards the opening of the high-frequency orifice passage so that the high-frequency orifice passage can be dependably switched between the open state and the blocked state.

A fifth mode of the present invention provides a fluid-filled type vibration damping device according to any one of the first to fourth modes wherein the at least one high-frequency orifice passage comprises a plurality of high-frequency orifice passages, and each of the plurality of high-frequency orifice passages is provided with the valve body at the opening thereof.

A sixth mode of the present invention provides a fluid-filled type vibration damping device according to the fifth mode wherein the plurality of high-frequency orifice passages are tuned to two or more different frequencies.

According to the fifth and sixth modes, by providing a plurality of high-frequency orifice passages, effective vibration damping action based on the flow action of the fluid can be achieved against vibration of a wider frequency range. Additionally, by designing each high-frequency orifice passage to be switched between the open state and the blocked state by a valve body, effective vibration damping action can be produced by each orifice passage. In preferred practice, closing operation conditions will differ for each valve body, as will be described later.

A seventh mode of the present invention provides a fluid-filled type vibration damping device according to any one of the first to sixth modes wherein the valve bodies are provided to both an opening at the pressure-receiving chamber end and an opening at the equilibrium chamber end of the high-frequency orifice passage.

According to the seventh mode, by arranging valve bodies in both the opening portion at the pressure-receiving chamber end and the opening portion at the equilibrium chamber end of the high-frequency orifice passage, at times of input of vibration in the frequency range to which the low-frequency orifice passage is tuned for example, the high-frequency orifice passage can be consistently held in the blocked state, regardless of whether the pressure-receiving chamber is in a positive pressure condition relative to the equilibrium chamber or the pressure-receiving chamber is in a negative pressure condition relative to the equilibrium chamber. Thus, fluid flow through the high-frequency orifice passage can be efficiently assured, and vibration damping action based on the flow action of the fluid can be advantageously achieved.

An eighth mode of the present invention provides a fluid-filled type vibration damping device according to any one of the fifth to seventh modes wherein the plurality of valve bodies are adapted to block the high-frequency orifice passages under mutually different conditions.

According to the eighth mode, where a plurality of high-frequency orifice passages with different tuning frequencies have been provided, each high-frequency orifice passage can be individually switched between the open state and the blocked state depending on its particular tuning frequency. For example, where high-frequency orifice passages tuned to higher frequency than the frequency of input vibration are maintained in the blocked state, fluid flow can efficiently arise through the high-frequency orifice passage that is tuned to the frequency of input vibration, and the intended vibration damping action can be advantageously achieved.

Meanwhile, where valve bodies are situated towards the openings at both the pressure-receiving chamber end and the equilibrium chamber end of a given high-frequency orifice passage, by adopting different closing operation conditions for these valve bodies so that, for example, fluid flow from the pressure-receiving chamber end to the equilibrium chamber end is obstructed while fluid flow from the equilibrium chamber end to the pressure-receiving chamber end is allowed, the level of negative pressure in the pressure-receiving chamber can be reduced. Cavitation noise (noise produced by water hammer pressure arising from bursting of bubbles that form due to cavitation), which is caused by excessive negative pressure in the pressure-receiving chamber, can be reduced or eliminated thereby. Also, through a design whereby, for example, fluid flow from the pressure-receiving chamber end to the equilibrium chamber end and fluid flow from the equilibrium chamber end to the pressure-receiving chamber end are allowed at times of input of vibration of mutually different frequency ranges, effective vibration damping action may be attained over a wider frequency range.

A ninth mode of the present invention provides a fluid-filled type vibration damping device according to the eighth mode wherein the plurality of valve bodies are elastically positioned and held by the independent spring members respectively; and the plurality of valve bodies are adapted to block the high-frequency orifice passages under mutually different conditions, through tuning of these spring members to mutually different spring constants.

According to the ninth mode, by providing respectively independent spring members for supporting the plurality of valve bodies, and imparting different spring constants to these spring members, it is a simple matter to establish different closing operation conditions for the plurality of valve bodies. Additionally, where the different closing operation conditions are established by varying the spring constant, closing operation conditions for the valve bodies can be established with a high degree of accuracy.

A tenth mode of the present invention provides a fluid-filled type vibration damping device according to any one of the first to ninth modes wherein a cushioning projection is formed in an opening section of the high-frequency orifice passage in a zone thereof that is contiguous with the valve body.

According to the tenth mode, impact force arising from striking of the valve body and the opening section of the high-frequency orifice passage is moderated by elastic deformation of the cushioning projection, so striking noise can be reduced. In preferred practice, the cushioning projection projects towards the valve body installation side and progressively narrows or tapers towards its projecting distal end so as to produce effective cushioning action.

An eleventh mode of the present invention provides a fluid-filled type vibration damping device according to any one of the first to tenth modes wherein the second mounting member is tubular in shape; the first mounting member is positioned spaced apart from an opening at one side of the second mounting member, with a fastening member for fastening the second mounting member to a damped component disposed at an opening at an opposite side of the second mounting member from the first mounting member; the pressure-receiving chamber is defined to a first mounting member side of the partition member in an axial direction of the second mounting member, and the equilibrium chamber is defined to an opposite side thereof; a middle chamber is defined in an interior of the partition member, and an elastic moveable film is positioned between the middle chamber and the pressure-receiving chamber; the high-frequency orifice passage is formed in the partition member so as to connect the middle chamber and the equilibrium chamber through a dividing wall section thereof that divides the middle chamber and the equilibrium chamber; and the valve body is situated in the opening section of the high-frequency orifice passage so that, in relation to the elastic moveable film in the axial direction of the second mounting member, the valve body is situated at the opening of the second mounting member at the side thereof where the fastening member for fastening to the damped component is disposed.

According to the eleventh mode, the valve body can be positioned offset towards the side closest to the damped component (the opposite side from the first mounting member). As a result, when impact force arising from striking of the valve body and the opening of the high-frequency orifice passage is transmitted to the damped component as moment in an angular direction, because the distance from the location of action of the impact force to the damped component is shorter, the moment is reduced. For this reason striking noise transmitted to the damped component can be reduced or eliminated, to achieve enhanced silence.

Effect of the Invention

According to the fluid-filled type vibration damping device of the present invention, effective vibration damping action of input vibration can be achieved over a wider frequency range by providing both a low-frequency orifice passage and a high-frequency orifice passage or passages. In particular, by providing a valve body to an opening or openings of the high-frequency orifice passage, which has low flow resistance, and switching the high-frequency orifice passage between the open and blocked state, vibration damping action by the low-frequency orifice passage will not be hampered by dissipation of fluid pressure through the high-frequency orifice passage, and effective vibration damping action may be attained. Additionally, under stationary conditions, the high-frequency orifice passage is held in the open state, and in response to input vibration having the frequency to which the low-frequency orifice passage is tuned, the valve body is urged closer towards the opening of the high-frequency orifice passage in opposition to the elastic force of the spring member, thereby obstructing the passage. For this reason, at the point in time that the valve body obstructs the opening of the high-frequency orifice passage, the speed of movement of the valve body is slowed by the elastic force of the spring member, thereby minimizing noise caused by striking of the valve body and the rim of the opening of the high-frequency orifice passage.

EMBODIMENTS FOR CARRYING OUT THE INVENTION

Figure 1:
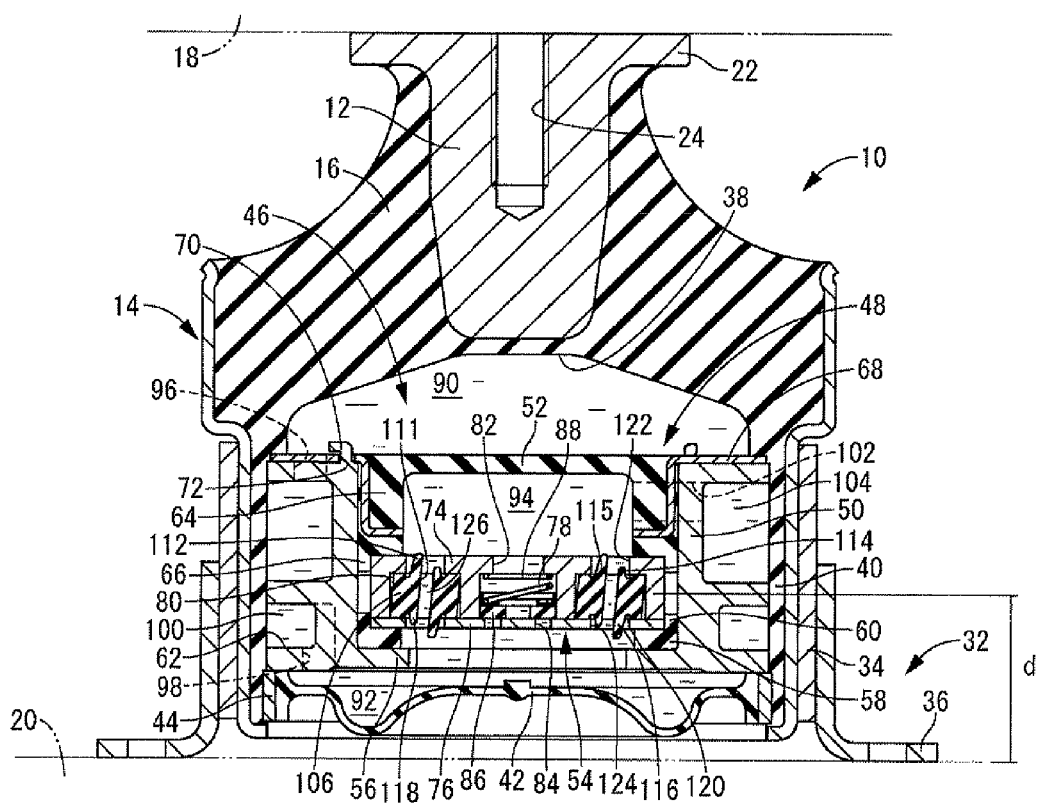
FIG. 1 is a longitudinal cross sectional view of a fluid-filled type vibration damping device in the form of an automotive engine mount according to a first embodiment of the present invention.

The embodiments of the present invention are described below with reference to the accompanying drawings. Referring first to FIG. 1, there is depicted an automotive engine mount 10 as a first embodiment of the fluid-filled type vibration damping device constructed according to the present invention. The automotive engine mount 10 has a construction in which a first mounting member 12 and a second mounting member 14 are linked to one another by a main rubber elastic body 16. The first mounting member 12 is attached to a power unit 18, while the second mounting member 14 is attached to the vehicle body 20, thereby providing vibration-damped linkage of the power unit 18 to the vehicle body 20. In the following description, as a general rule, the vertical direction refers to the axial direction, which is the vertical direction in FIG. 1.

Turning to a more detailed discussion, the first mounting member 12 is a high rigidity component made of metal or the like having generally circular post shape. A flange portion 22 which flares peripherally outward is integrally formed at the top end of the first mounting member 12. In the first mounting member 12 there is additionally formed a bolt hole 24 that opens onto the upper end face and extends in the vertical direction along the center axis.

Meanwhile, like the first mounting member 12, the second mounting member 14 is a high rigidity component having thin-walled, large-diameter, generally stepped round cylinder shape. A bracket 32 has been installed on the second mounting member 14. The bracket 32 is a high rigidity component having a construction in which a plurality of mounting leg portions 36 provided as fastening portions are fastened to the outside peripheral face of a tubular mated-fit portion 34 designed to fit externally about the second mounting member 14. With the bracket 32 fastened to the second mounting member 14 by a mated fit, the mounting leg portions 36 are positioned to the lower end side of the second mounting member 14 so that the flanged attachment sections of the mounting leg portions 36 project down past the bottom end of the second mounting member 14.

The first mounting member 12 and the second mounting member 14 are elastically linked by the main rubber elastic body 16, with the first mounting member 12 positioned spaced apart from upper opening of the second mounting member 14. The main rubber elastic body 16 has thick-walled, large-diameter, generally truncated conical shape into whose small-diameter end part the first mounting member 12 has been inserted and vulcanization bonded; and whose large-diameter end part has been juxtaposed against and vulcanization bonded to the inside peripheral face of the second mounting member 14. The main rubber elastic body 16 takes the form of an integrally vulcanization molded component incorporating the first mounting member 12 and the second mounting member 14.

A large-diameter recess 38 of inverted bowl shape is formed opening onto the large-diameter end face of the main rubber elastic body 16. Additionally, a seal rubber layer 40 is integrally fowled at the outside peripheral edge of the large-diameter end face of the main rubber elastic body 16, and extends downward to sheathe the inside peripheral face of the second mounting member 14.

A flexible film 42 is attached to the lower end of the second mounting member 14. The flexible film 42 is formed by a thin rubber film having generally circular disk shape with ample slack in the axial direction. An annular fastener fitting 44 is vulcanization bonded to the outside peripheral edge part of the flexible film 42. The fastener fitting 44 is slipped into the lower end of the second mounting member 14 and secured in a mated fit with the second mounting member 14 via the seal rubber layer 40.

The upper opening of the second mounting member 14 is thereby provided closure by the main rubber elastic body 16 while the lower opening is provided closure by the flexible film 42, thereby defining between the axially opposed faces of the main rubber elastic body 16 and the flexible film 42 a fluid chamber 46 that is filled with a non-compressible fluid. While no particular limitation is imposed as to the non-compressible fluid, preferred examples are water, alkylene glycols, polyalkylene glycols, silicone oil, and mixtures of these. In terms of advantageously achieving vibration damping action based on flow action of the fluid, a low-viscosity fluid having viscosity of 0.1 Pa·s or lower is especially preferred.

A partition member 48 is arranged in the fluid chamber 46 and is supported by the second mounting member 14. The partition member 48 has a thick, generally circular disk shape overall, and includes a partition member body 50 of generally round cylindrical shape, an elastic moveable film 52 providing closure to the upper opening of the partition member body 50, and a moveable dividing wall 54 situated at the lower opening of the partition member body 50.

The partition member body 50 has generally round cylindrical shape and is made of metal, rigid synthetic resin, or the like. A support piece 56 resembling an inner flange is integrally formed at the lower opening of the partition member body 50. A rubber elastic support 58 of annular shape is anchored juxtaposed against the upper face of the support piece 56. A lower outside peripheral support portion 60 of upwardly projecting annular shape is integrally formed at the outside peripheral edge part of this rubber elastic support 58. A circumferential groove 62 extending for a prescribed length short of twice around the circumference is formed in the outside peripheral edge part of the partition member body 50, and opens onto its outside peripheral face.

The elastic moveable film 52 is attached to the partition member body 50. The elastic moveable film 52 is a rubber elastic body having generally circular disk shape at whose outside peripheral edge is integrally formed an elastic support cylinder portion 64 of downwardly projecting tubular shape. An upper outside peripheral support portion 66 of downwardly projecting annular shape is integrally formed at the outside peripheral edge part of this elastic support cylinder portion 64.

A support fitting 68 is vulcanization bonded to the elastic moveable film 52. The support fitting 68 is generally shaped like an annular disk having a stepped profile whose inside peripheral part lies below the outside peripheral part, to either side of a step provided in the diametrical medial section. The step of the support fitting 68 and the section thereof to the inside peripheral side of the step are embedded in and anchored to the elastic support cylinder portion 64 which is disposed at the outside peripheral edge part of the elastic moveable film 52, so that the center hole of the support fitting 68 is closed off by the elastic moveable film 52. The elastic moveable film 52 takes the form of an integrally vulcanization molded article incorporating the support fitting 68.

The integrally vulcanization molded article of the elastic moveable film 52 is attached to the partition member body 50 by juxtaposing and securing the section thereof lying to the outer peripheral side of the step against the upper face of the partition member body 50. With the elastic moveable film 52 installed in the partition member body 50, the upper opening of the center hole of the partition member body 50 is closed off by the elastic moveable film 52. In the present embodiment, the support fitting 68 is secured positioned with respect to the partition member body 50 by a catch hook 70 that projects upward from the upper end face of the partition member body 50 and that inserts and locks in place into a catch hole 72 passing through the support fitting 68. Also, with the elastic moveable film 52 installed in the partition member body 50, the lower end face of the elastic support cylinder portion 64 is positioned in opposition across a gap to the upper end face of the rubber elastic support 58 in the axial direction.

The moveable dividing wall 54 is situated axially between the elastic support cylinder portion 64 which has been integrally formed with the elastic moveable film 52, and the rubber elastic support 58 which is supported by the support piece 56 of the partition member body 50. The moveable dividing wall 54 is fowled by a dividing wall body 74 of inverted, generally shallow saucer shape overall, and a base plate member 76 of generally circular disk shape overall, with the lower opening of the dividing wall body 74 covered by the base plate member 76. A cylindrical wall portion is formed in the diametrical medial section of the dividing wall body 74 and bifurcates the space defined within the moveable dividing wall 54 into a central receptacle area 78 situated to the inside peripheral side of the wall portion, and an outside peripheral receptacle area 80 situated to the outside peripheral side of the wall portion.

In the central receptacle area 78, an upper short circuiting hole 82 passes through in the upper wall, and several lower short circuiting holes 84 pass through the lower wall. An annular rubber plate 86 provided as the valve body is arranged in the central receptacle area 78. The annular rubber plate 86 is a rubber elastic body having generally annular disk shape of outside diameter approximately the same as the inside diameter of the central receptacle area 78. This annular rubber plate 86 is juxtaposed from above against the base plate member 76, and blocks the lower short circuiting holes 84 which pass through the base plate member 76.

A coil spring 88 of metal provided as the urging means is arranged between the annular rubber plate 86 and the upper base wall of the dividing wall body 74. The annular rubber plate 86 having been juxtaposed from above against the base plate member 76 is urged axially downward by the coil spring 88 and pushed against the base plate member 76. The several lower short circuiting holes 84 which pass through the base plate member 76 are thereby blocked by the annular rubber plate 86. A positioning fitting of annular shape is clipped onto the lower end of the coil spring 88, and is positioned interposed between the annular rubber plate 86 and the coil spring 88, and interposed between the lower end of the coil spring 88 and the peripheral wall of the central receptacle area 78. The coil spring 88, which is smaller in diameter than the central receptacle area 78, is thereby positioned in the diametrical direction within the central receptacle area 78 by the positioning fitting. The coil spring may instead have a tapered shape of progressively larger diameter towards the upper end in the axial direction so that the upper end thereof is equal in diameter to the inside diameter of the central receptacle area 78, in order to position the coil spring within the central receptacle area 78 through contact at its upper end.

The moveable dividing wall 54 having this construction fits inside the center hole of the cylindrical partition member body 50, and is held between the axially opposed lower end face of the elastic support cylinder portion 64 of the elastic moveable film 52 and the support piece 56 formed on the partition member body 50. The moveable dividing wall 54 is elastically supported between rubber elastic bodies, namely, the elastic support cylinder portion 64 and the rubber elastic support 58 which has been juxtaposed against the upper face of the support piece 56, thereby allowing minute displacement of the moveable dividing wall 54 in the axial direction.

According to the present embodiment, the outside peripheral face of the moveable dividing wall 54 and the inside peripheral face of the partition member body 50 are positioned in opposition a prescribed distance apart in the diametrical direction. The upper outside peripheral support portion 66 integrally formed with the elastic support cylinder portion 64, and the lower outside peripheral support portion 60 integrally formed with the rubber elastic support 58, are interposed between the outside peripheral face of the moveable dividing wall 54 and the inside peripheral face of the partition member body 50; and the moveable dividing wall 54 is elastically positioned in the axis-perpendicular direction with respect to the partition member body 50.

The partition member 48 having the above construction is arranged inside the fluid chamber 46 so as to extend in the axis-perpendicular direction, with the partition member body 50 elastically supported fitting into the second mounting member 14 via the seal rubber layer 40. The fluid chamber 46 is thereby bifurcated into top and bottom parts lying to either side of the partition member 48, with a pressure-receiving chamber 90 whose wall is partly constituted by the main rubber elastic body 16 and which gives rise to pressure fluctuations defined to the upper side of the partition member 48. Meanwhile, to the lower side of the partition member 48 there is defined an equilibrium chamber 92 whose wall is partly constituted by the flexible film 42, and which is adapted to readily permit changes in volume.

In the interior of the partition member 48, a middle chamber 94 is defined between the axially opposed faces of the elastic moveable film 52 and the moveable dividing wall 54. Specifically, the moveable dividing wall 54 has been arranged and elastically supported in the lower opening section of the center hole of the generally round cylindrical partition member body 50, and the elastic moveable film 52 has been arranged covering the upper opening section. A middle chamber 94 separated from the pressure-receiving chamber 90 and from the equilibrium chamber 92 is thereby defined between the axially opposed faces of the elastic moveable film 52 and the moveable dividing wall 54. In other words, the middle chamber 94 is defined axially between pressure-receiving chamber 90 and the equilibrium chamber 92, and is separated from the pressure-receiving chamber 90 by the elastic moveable film 52 while being separated from the equilibrium chamber 92 by the moveable dividing wall 54. That is, the pressure-receiving chamber 90, the elastic moveable film 52, the middle chamber 94, the moveable dividing wall 54, and the equilibrium chamber 92 are arranged in series in the axial direction in that order, starting from the first mounting member 12 end. Like the pressure-receiving chamber 90 and the equilibrium chamber 92, the middle chamber 94 is filled with a noncompressible fluid.

The partition member 48 is supported by the second mounting member 14, whereby the outside peripheral opening of the circumferential groove 62 is covered by the second mounting member 14 to form a tunnel-like passage extending in the circumferential direction. A first lengthwise end of the circumferential groove 62 communicates with the pressure-receiving chamber 90 through an upper connecting hole 96, while the other end communicates with the equilibrium chamber 92 through a lower connecting hole 98. Thereby, there is formed in the partition member body 50 a low-frequency orifice passage 100 connecting the pressure-receiving chamber 90 and the equilibrium chamber 92 to one another. In the present embodiment, the low-frequency orifice passage 100 is tuned to low frequency on the order of 10 Hz corresponding to engine shake. By forming the low-frequency orifice passage 100 so as to extend in the circumferential direction, longer passage length of the low-frequency orifice passage 100 can be efficiently assured, thus facilitating tuning to low frequency.

Additionally, in the medial section of the low-frequency orifice passage 100 as viewed in the lengthwise direction of the passage, a middle connecting hole 102 is formed passing in the diametrical direction through the wall on the inside peripheral side. The pressure-receiving chamber 90 and the middle chamber 94 thereby communicate with one another through the agency of the middle connecting hole 102 and the end of the low-frequency orifice passage 100 on the pressure-receiving chamber 90 side thereof, so that the middle connecting hole 102 and part of the low-frequency orifice passage 100 define in the partition member body 50 a midrange-frequency orifice passage 104 tuned to higher frequency than the low-frequency orifice passage 100. In the present embodiment, the midrange-frequency orifice passage 104 is tuned to midrange frequency on the order of 15 to 45 Hz corresponding to idling vibration. At times of input of vibration having the frequency to which the midrange-frequency orifice passage 104 is tuned, ample fluid pressure transmission takes place between the middle chamber 94 and the equilibrium chamber 92 through a high-frequency orifice passage 126, discussed later, so the middle chamber 94 functions substantially as part of the equilibrium chamber 92. Accordingly, the midrange-frequency orifice passage 104 may be viewed as substantially connecting the pressure-receiving chamber 90 and the equilibrium chamber 92 to one another.

Additionally, the moveable dividing wall 54 is elastically supported with respect to the partition member body 50 by the rubber elastic support 58 in such a way as to be displaceable in the vertical direction, thereby constituting a single vibrating subsystem (dynamic damper) that includes the moveable dividing wall 54 as the mass system and the rubber elastic support 58 as the spring system. In the present embodiment, the natural frequency of the moveable dividing wall 54 is tuned to a high frequency range corresponding to rumble during high-speed driving of the automobile. It is possible to tune the natural frequency of the moveable dividing wall 54 through modification of the material or shape of the moveable dividing wall 54 and/or the rubber elastic support 58. When tuning the natural frequency, it is necessary that, in addition to the mass of the moveable dividing wall 54 per se, the fluid mass between the moveable dividing wall 54 and the elastic moveable film 52 that undergoes displacement in unison with the moveable dividing wall 54 also be taken into consideration as a mass component of the dynamic damper that includes the moveable dividing wall 54. Meanwhile, it is necessary that not only the rubber elastic support 58 spring component, but also the elastic moveable film 52 spring component and the spring component of the pressure-receiving chamber 90 and the equilibrium chamber 92 (expansion spring component), be taken into consideration as spring components of the dynamic damper. For the above reasons, it is preferable for tuning of the natural frequency of the moveable dividing wall 54 to be carried out with the automotive engine mount 10 actually installed on the power unit 18.

Additionally, the partition member body 50 is elastically supported with respect to the second mounting member 14 through the agency of the seal rubber layer 40. An additional vibrating subsystem (dynamic damper) that includes the partition member 48 as the mass system and the seal rubber layer 40 as the spring system is constituted thereby. There is attained as a result a serial two-degree-of-freedom system vibration model including the dynamic damper composed of the moveable dividing wall 54 and the rubber elastic support 58, and the dynamic damper composed of the partition member body 50 and the seal rubber layer 40. Here, provided that the natural frequency of the partition member 48 lies in a higher frequency range than the tuning frequency of the midrange-frequency orifice passage 104, it may be tuned either to a higher frequency range or a lower frequency range than the natural frequency of the moveable dividing wall 54, in consideration of factors such as the required vibration damping characteristics. While it is possible for the natural frequency of the partition member 48 to be tuned through modification of the material or shape of the partition member 48 and/or the seal rubber layer 40, as with moveable dividing wall 54 it is preferable for tuning to be carried out with the automotive engine mount 10 installed on the power unit 18.

The annular rubber plate 86 and the coil spring 88 which have been arranged in the central receptacle area 78 of the moveable dividing wall 54 constitute a one-way valve. When positive pressure is exerted on the pressure-receiving chamber 90 and the middle chamber 94, this one-way valve is maintained pressed against the base plate member 76 of the annular rubber plate 86, so that the lower short circuiting holes 84 are held in the blocked state. If on the other hand the pressure-receiving chamber 90 is acted upon by excessive negative pressure causing a large drop in pressure of the middle chamber 94 due to the negative pressure, the annular rubber plate 86 becomes displaced axially upward away from the base plate member 76 in opposition to the urging force of the coil spring 88 so that the lower short circuiting holes 84 are switched to the open state. The annular rubber plate 86 has been juxtaposed against the base plate member 76 from the pressure-receiving chamber 90 side, and when positive pressure is exerted on the pressure-receiving chamber 90, the lower short circuiting holes 84 are consistently held in the closed state through the action of the positive pressure and the urging force of the coil spring 88.

Figure 2:
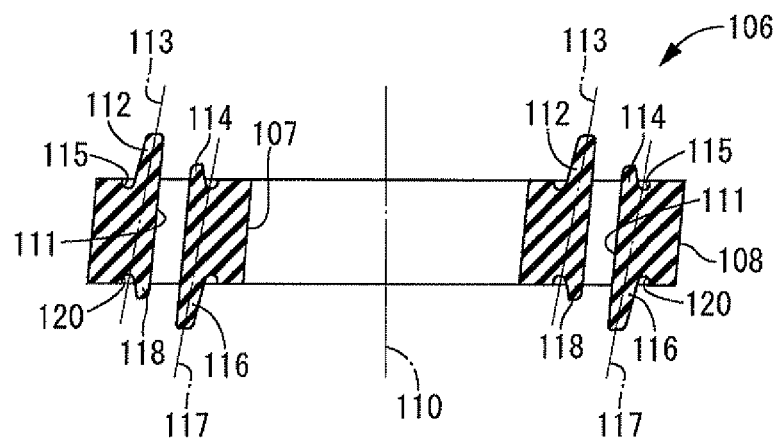
FIG. 2 is a vertical cross sectional view of a passage-defining rubber part of the engine mount shown in FIG. 1, taken along line 2-2 of FIG. 3.
Figure 3:
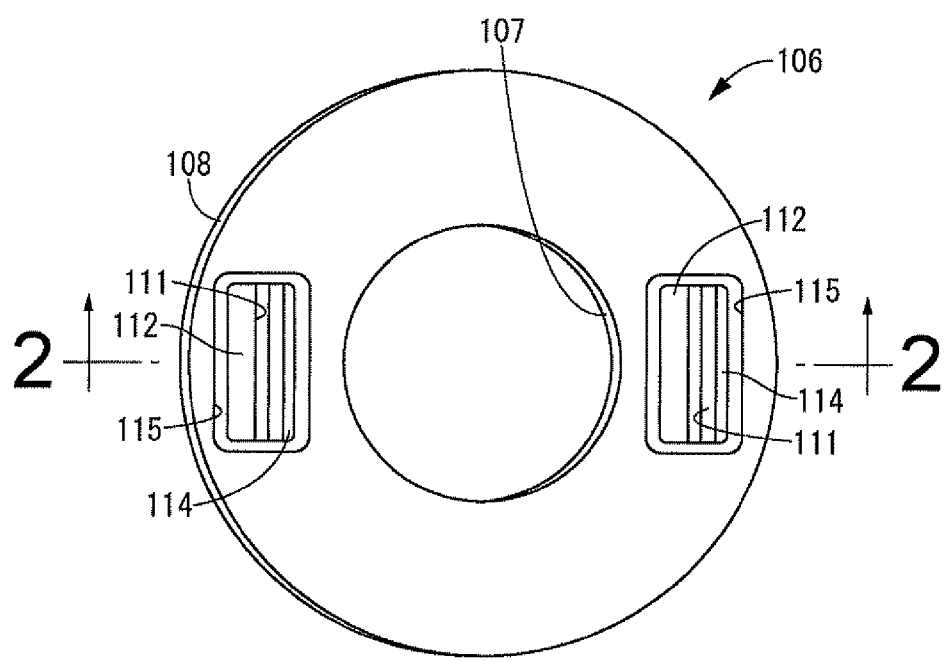
FIG. 3 is a plan view of the passage-defining rubber part shown in FIG. 2.

Here, a passage-defining rubber part 106 is arranged in the outside peripheral receptacle area 80 formed inside the moveable dividing wall 54. As depicted in FIGS. 2 and 3, the passage-defining rubber part 106 is formed by a rubber elastic body having generally annular disk shape, with the center axis of its inside peripheral wall 107 and the center axis of its outside peripheral wall 108 aligned with the center axis of the automotive engine mount 10 but inclined with respect to the center axis 110 of the passage-defining rubber part 106.

As shown in FIG. 3, a pair of communication holes 111, 111 are formed in this passage-defining rubber part 106 in regions thereof situated in opposition along a diametrical axis. Each of the communication holes 111 passes through the passage-defining rubber part 106 in the thickness direction, with the opening on one face and the opening on the other face being formed at locations offset from one another in the direction of opposition of the pair of communication holes 111, 111. That is, in the longitudinal cross section depicted in FIG. 2, each communication hole 111 extends in a straight line on an incline with respect to the center axis 110 of the passage-defining rubber part 106. The pair of communication holes 111, 111 are inclined at mutually identical slope angles as they pass through the passage-defining rubber part 106.

Each communication hole 111 has elongated cross sectional hole contours extending in a straight line in the axis-perpendicular direction (the vertical direction in FIG. 3) orthogonal to the diametrical axis of opposition of the pair of communication holes 111, 111. Specifically, the dimension of each communication hole 111 in the axis-perpendicular direction orthogonal to the diametrical axis of opposition of the pair of communication holes 111, 111 (length dimension) is sufficiently greater than its dimension in the direction of opposition of the pair of communication holes 111, 111 (width dimension). The length of each communication hole 111 is such that it does not reach the outside peripheral face of the passage-defining rubber part 106.

To one side of each communication hole 111 in the width direction (the diametrical axis of opposition of the pair of communication holes 111, 111) an upwardly projecting upper valve-like rubber projection 112 is integrally formed with the passage-defining rubber part 106. The upper valve-like rubber projections 112 are of tabular form projecting upward from the edge of the openings of the communication holes 111 and extending along the communication holes 111. The upper valve-like rubber projections 112 become progressively thinner going upward towards their projecting distal end. The end face of the upper valve-like rubber projection 112 at the communication hole 111 side thereof is defined by a sloping flat face that connects smoothly with the inside face at one widthwise side (the left side in FIG. 2) of the communication hole 111 so as to avoid a depression or ridge. As shown in FIG. 2, the elastic principal axis 113 extending in the projection direction of the upper valve-like rubber projection 112 inclines towards the communication hole 111 with respect to the axial direction of the automotive engine mount 10 as it approaches the projecting distal end.

To the opposite side of each communication hole 111 from the upper valve-like rubber projection 112, an integrally formed upper cushioning projection 114 projects upwardly from the passage-defining rubber part 106. The upper cushioning projections 114 project upward from the edge of the openings of communication holes 111 and extend along the communication holes 111. Like the upper valve-like rubber projections 112, the upper cushioning projections 114 become progressively thinner going upward towards their projecting distal end. The upper cushioning projections 114 have shorter projecting height than the upper valve-like rubber projections 112, while their thickness dimension is equal to or slightly smaller than that of the upper valve-like rubber projections 112, making them more resistant to elastic deformation than the upper valve-like rubber projections 112. The projecting distal end part of the upper cushioning projection 114, on at least the end face thereof lying towards the communication hole 111, is defined by a curving face of arcuate contours in longitudinal cross section.

Upper slots 115 are formed on the upper face of the passage-defining rubber part 106. The upper slots 115 open onto the upper face of the passage-defining rubber part 106, and encircle the communication holes 111, the upper valve-like rubber projections 112, and the upper cushioning projections 114. The upper slots 115 extend along the basal end of the upper valve-like rubber projections 112 and the basal end of the upper cushioning projections 114, and ameliorate flexure of the passage-defining rubber part 106 induced by elastic deformation of the upper valve-like rubber projections 112 and the upper cushioning projections 114.

Meanwhile, on the same side of the communication holes 111 as the upper cushioning projections 114, integrally formed lower valve-like rubber projections 116 project downward from the passage-defining rubber part 106. The lower valve-like rubber projections 116 project downward from the edge of the openings of the communication holes 111 and extend along the communication holes 111 with cross sectional contours corresponding to those of the upper valve-like rubber projections 112. The lower valve-like rubber projections 116 become progressively thinner going downward towards their projecting distal end. The end face of the lower valve-like rubber projection 116 at the communication hole 111 side thereof is defined by a sloping flat face that connects smoothly with the inside face at the other widthwise side (the right side in FIG. 2) of the communication hole 111 so as to avoid a depression or ridge. As shown in FIG. 2, the elastic principal axis 117 extending in the projection direction of the lower valve-like rubber projection 116 inclines towards the communication hole 111 with respect to the axial direction of the automotive engine mount 10 as it approaches the projecting distal end. The elastic principal axes 113 of the upper valve-like rubber projections 112 and the elastic principal axes 117 of the lower valve-like rubber projections 116 extend parallel to one another.

At the opposite side of the communication holes 111 from the lower valve-like rubber projections 116, that is, on the same side of the communication holes 111 as the upper valve-like rubber projections 112, integrally formed lower cushioning projections 118 project downward from the passage-defining rubber part 106. The lower cushioning projections 118 project downward from the edge of the openings of communication holes 111 and extend along the communication holes 111. Like the lower valve-like rubber projections 116, the lower cushioning projections 118 have tabular contours becoming progressively thinner going downward towards their projecting distal end. The lower cushioning projections 118 have shorter projecting height than the lower valve-like rubber projections 116, while their thickness dimension is equal to or slightly smaller than that of the lower valve-like rubber projections 116, making them more resistant to elastic deformation than the lower valve-like rubber projections 116. The projecting distal end part of the lower cushioning projection 118, on at least the end face thereof lying towards the communication hole 111, is defined by a curving face of arcuate contours in longitudinal cross section.

Lower slots 120 are formed on the lower face of the passage-defining rubber part 106. The lower slots 120 open onto the lower face of the passage-defining rubber part 106, and encircle the communication holes 111, the lower valve-like rubber projections 116, and the lower cushioning projections 118. The lower slots 120 extend along the basal end of the lower valve-like rubber projections 116 and the basal end of the lower cushioning projections 118, and ameliorate flexure of the passage-defining rubber part 106 induced by elastic deformation of the lower valve-like rubber projections 116 and the lower cushioning projections 118. The upper and lower valve-like rubber projections 112, 116, and the upper and lower cushioning projections 114, 118, and the upper and lower slots 115, 120 are respectively provided at the peripheral edges of the pair of communication holes 111, 111.

The passage-defining rubber part 106 constructed in the above manner is arranged accommodated within the outside peripheral receptacle area 80 formed inside the moveable dividing wall 54. The passage-defining rubber part 106 is clasped between the upper base wall part of the dividing wall body 74 and the base plate member 76, with the outside peripheral face and inside peripheral face thereof at least partly in abutment with the inside face of the outside peripheral receptacle area 80.

In addition, upper passage holes 122 of communicating hole form pass through the upper wall part of the outside peripheral receptacle area 80 of the moveable dividing wall 54, and lower passage holes 124 of communicating hole form pass through the lower wall part of the outside peripheral receptacle area 80. In the outside peripheral receptacle area 80, the communication holes 111 communicate with the middle chamber 94 through the upper passage holes 122, and the communication holes 111 communicate with the equilibrium chamber 92 through the lower passage holes 124. By positioning the passage-defining rubber part 106 with respect to the outside peripheral receptacle area 80 of the moveable dividing wall 54, the passage holes constituted by the upper passage holes 122, the lower passage holes 124, and the outside peripheral receptacle area 80 are blocked by the passage-defining rubber part 106.

Through the upper passage holes 122 the communication holes 111 communicate at one opening thereof with the middle chamber 94, and through the lower passage holes 124 the communication holes 111 communicate at the other opening thereof with the equilibrium chamber 92. High-frequency orifice passages 126 connecting the middle chamber 94 and the equilibrium chamber 92 to one another via the communication holes 111 are thereby formed in the passage-defining rubber part 106 constituting part of the partition member 48. The high-frequency orifice passages 126 are tuned to a higher frequency range than the midrange-frequency orifice passage 104; for example, they may be tuned to high frequency on the order of 45 to 100 Hz corresponding to lockup rumble caused by torque fluctuations of the engine. In the present embodiment, two high-frequency orifice passages 126 tuned to the same frequency are provided. Like the midrange-frequency orifice passage 104, the high-frequency orifice passages 126 may be viewed as substantially connecting the pressure-receiving chamber 90 and the equilibrium chamber 92 to one another.

The upper valve-like rubber projections 112 and the upper cushioning projections 114 insert into the upper passage holes 122 and protrude out towards the pressure-receiving chamber 90 (middle chamber 94) side; while the lower valve-like rubber projections 116 and the lower cushioning projections 118 insert into the lower passage holes 124 and protrude out towards the equilibrium chamber 92 side. With the automotive engine mount 10 in a stationary condition, the upper valve-like rubber projections 112 and the lower valve-like rubber projections 116 positioned at the openings of the high-frequency orifice passages 126 serve to maintain the openings of the high-frequency orifice passages 126 in the open state, owing to their inherent elasticity. At times of input of vibration of lower frequency than the tuning frequency of the high-frequency orifice passages 126 (in other words, large-amplitude vibration), the upper valve-like rubber projections 112 and the lower valve-like rubber projections 116 experience elastic deformation so as to collapse towards the communication hole 111 side in response to relative pressure fluctuations between the pressure-receiving chamber 90 and the equilibrium chamber 92. The openings of the high-frequency orifice passages 126 thereby become covered by the upper valve-like rubber projections 112 or the lower valve-like rubber projections 116, switching the high-frequency orifice passages 126 to the blocked state. That is, the upper valve-like rubber projections 112 and the lower valve-like rubber projections 116 function as valve bodies for switching the high-frequency orifice passages 126 between the open state and the blocked state; while at the same time, owing to the inherent elasticity of the projections, in nonloaded form they are spaced apart from the openings of the high-frequency orifice passage 126, and function as spring members for maintaining the high-frequency orifice passages 126 in the open state under stationary conditions.

The inside peripheral wall of the upper passage hole 122 constitutes a first restricting abutment portion for limiting collapsing deformation of the upper valve-like rubber projection 112 towards the opposite side from the communication hole 111; and the inside peripheral wall of the lower passage hole 124 constitutes a second restricting abutment portion for limiting collapsing deformation of the lower valve-like rubber projection 116 towards the opposite side from the communication hole 111. The inside peripheral wall of the upper passage hole 122 also limits collapse of the upper cushioning projection 114 towards the opposite side from the communication hole 111, while the inside peripheral wall of the lower passage hole 124 limits collapse of the lower cushioning projection 118 towards the opposite side from the communication hole 111.

The upper valve-like rubber projections 112 are designed to come into abutment with the upper cushioning projections 114 through elastic deformation. Meanwhile, the lower valve-like rubber projections 116 are designed to come into abutment with the lower cushioning projections 118 through elastic deformation. That is, the upper and lower cushioning projections 114, 118 are disposed in zones that are positioned in proximity to the upper and lower valve-like rubber projections 112, 116 when the high-frequency orifice passages 126 are blocked.

The automotive engine mount 10 constructed as above is installed with the first mounting member 12 attached to the power unit 18 by screwing a mounting bolt (not shown) into the bolt hole 24, and with the second mounting member 14 attached to the vehicle body 20 by bolting the mounting leg portions 36 of the bracket 32 to the vehicle body 20. The flange-like attachment points of the mounting leg portions 36 are positioned below the lower end of the second mounting member 14, and with the automotive engine mount 10 installed in the vehicle, the attachment locations of the second mounting member 14 to the vehicle body 20 will be located below the automotive engine mount 10. Thus, the equilibrium chamber 92 formed to the lower side of the partition member 48 in FIG. 1 will be situated at a location close to the vehicle body 20 in the automotive engine mount 10.

Additionally, because the passage-defining rubber part 106 is arranged accommodated in the dividing wall section (moveable dividing wall 54) that divides the middle chamber 94 and the equilibrium chamber 92 in the partition member 48, the passage-defining rubber part 106 is situated at a closer location to the vehicle body 20 in the axial direction. That is, there is a shorter axial separation distance: d from the center of thickness of the passage-defining rubber part 106 to the attachment points of the second mounting member 14 to the vehicle body 20 (the lower faces of the mounting leg portions 36).

In particular, placement of the passage-defining rubber part 106 in the axial direction is offset appreciably towards the vehicle body 20 (the equilibrium chamber 92 side, also the lower side in FIG. 1) from the axial center of the second mounting member 14. The passage-defining rubber part 106 is positioned at a location closer in the axial direction to the attachment points of the second mounting member 14 to the vehicle body 20 than to the attachment point of the first mounting member 12 to the power unit 18.

The passage-defining rubber part 106 is positioned to the equilibrium chamber 92-side opening of the center hole of the partition member body 50, the elastic moveable film 52 is positioned covering the pressure-receiving chamber 90-side opening of the center hole of the partition member body 50, and the passage-defining rubber part 106 is positioned to the vehicle body 20 side of the elastic moveable film 52. Additionally, the positioned location of the passage-defining rubber part 106 in the axial direction is offset towards the vehicle body 20 side from the axial center of the partition member 48.

With the automotive engine mount 10 constructed in the above manner installed in the vehicle, when low-frequency, large-amplitude vibration corresponding to engine shake is input, fluid flow through the low-frequency orifice passage 100 is produced on the basis of relative pressure fluctuations arising between the pressure-receiving chamber 90 and the equilibrium chamber 92. Vibration damping action (high attenuating action) is produced on the basis of the resultant flow action of fluid.

Also, at times of input of low-frequency, large-amplitude vibration, the midrange-frequency orifice passage 104 and the high-frequency orifice passage 126 are blocked, and vibration damping action based on fluid flow through the low-frequency orifice passage 100 is produced efficiently. The midrange-frequency orifice passage 104 assumes a substantially blocked state preventing fluid flow due to the high-frequency orifice passage 126 becoming blocked; accordingly, the reason for the high-frequency orifice passage 126 becoming blocked is discussed below.

Specifically, when fluid flows from the pressure-receiving chamber 90 into the middle chamber 94 through the midrange-frequency orifice passage 104 causing the pressure to rise in the middle chamber 94, the upper valve-like rubber projections 112 experience bending deformation towards the communication holes 111 and come into abutment with the upper cushioning projections 114. The openings of the high-frequency orifice passages 126 on the middle chamber 94 side are thereby covered by the upper valve-like rubber projections 112, thus blocking the high-frequency orifice passages 126. As reasons that the upper valve-like rubber projections 112 bend towards the communication holes 111, firstly, it is posited that because the upper valve-like rubber projections 112 are shaped so as to project at an incline towards the communication holes 111, they readily undergo elastic deformation so as to collapse towards the communication holes 111 due to the action of positive pressure from above. Another reason is that the first restricting abutment portion defined by the dividing wall body 74 prevents the upper valve-like rubber projections 112 from elastically deforming in the opposite direction from the communication holes 111. Additionally, when fluid flows from the middle chamber 94 into the equilibrium chamber 92 through the high-frequency orifice passages 126, negative pressure based on flow velocity is exerted on the upper valve-like rubber projections 112 disposed at the upstream end of the fluid, giving rise to suctioning force towards the communication holes 111 that acts on the upper valve-like rubber projections 112 and also serves to induce elastic deformation of the upper valve-like rubber projections 112 so that they cover the communication holes 111.

On the other hand, when fluid flows out from the middle chamber 94 into the pressure-receiving chamber 90 causing the pressure in the middle chamber 94 to drop, the lower valve-like rubber projections 116 experience bending deformation towards the communication holes 111 and come into abutment with the lower cushioning projections 118. The openings of the high-frequency orifice passages 126 on the middle chamber 94 side thereby become covered by the upper valve-like rubber projections 112, blocking the high-frequency orifice passages 126. The reasons that the lower valve-like rubber projections 116 bend towards the communication holes 111 are thought to be analogous to those for the upper valve-like rubber projections 112, i.e. because the lower valve-like rubber projections 116 are shaped projecting at an incline towards the communication holes 111; because elastic deformation thereof towards the opposite direction from the communication holes 111 is prevented by the second restricting abutment portion; and because the action of negative pressure based on flow velocity gives rise to suctioning force towards the communication holes 111 that acts on the lower valve-like rubber projections 116.

When the high-frequency orifice passages 126 become blocked in this way, the upper valve-like rubber projections 112 come into abutment with the upper cushioning projections 114 and the lower valve-like rubber projections 116 come into abutment with the lower cushioning projections 118, thereby reducing or eliminating striking noise. Specifically, because the upper and lower valve-like rubber projections 112, 116 and the upper and lower cushioning projections 114, 118 are each formed by a rubber elastic body, the impact force when they strike together is attenuated through elastic deformation of the valve-like rubber projections 112, 116 and the cushioning projections 114, 118, thus reducing noise during striking.

Moreover, at the projecting distal end sections of the cushioning projections 114, 118, the ends that lie towards the communication holes 111 and that are intended to come into abutment with the valve-like rubber projections 112, 116, are defined by curving faces of arcuate longitudinal cross section. For this reason, the contact area during initial contact between the valve-like rubber projections 112, 116 and the cushioning projections 114, 118 is quite small, with the contact area becoming progressively larger thereafter. Thus, cushioning action is produced more effectively during initial contact, and striking noise is advantageously reduced when the high-frequency orifice passages 126 become blocked.

Also, in the automotive engine mount 10, the moveable dividing wall 54 which supports the passage-defining rubber part 106 is situated at a location such that it separates the middle chamber 94 and the equilibrium chamber 92. Thus, the separation distance: d in the axial direction between the passage-defining rubber part 106 and the attachment points of the second mounting member 14 to the vehicle body 20 (the lower faces of the mounting leg portions 36 of the bracket 32) is smaller than it would be if the passage-defining rubber part 106 were positioned in the dividing wall section between the pressure-receiving chamber 90 and the equilibrium chamber 92.

Consequently, because the impact force arising when the valve-like rubber projections 112, 116 and the cushioning projections 114, 118 strike together at times of vibration input is generally unchanging regardless of the positioning location of the passage-defining rubber part 106 in the axial direction, a shorter separation distance between the positioning location of the passage-defining rubber part 106 (which represents the point of action of impact force) and the attachment points of the second mounting member 14 to the vehicle body 20 means that the moment acting on the attachment points as a result of impact force will be smaller. Accordingly, in an automotive engine mount 10 in which the passage-defining rubber part 106 and the attachment points of the second mounting member 14 to the vehicle body 20 are separated by only a short distance, transmission to the vehicle body 20 of noise and vibration resulting from the valve-like rubber projections 112, 116 and the cushioning projections 114, 118 striking together can be reduced or prevented.

Furthermore, the passage-defining rubber part 106 is arranged in the moveable dividing wall 54; and through the agency of the elastic support cylinder portion 64 and the rubber elastic support 58, the moveable dividing wall 54 is elastically supported with respect to the partition member body 50, which is in turn supported by the second mounting member 14. For this reason, impact force arising when the valve-like rubber projections 112, 116 and the cushioning projections 114, 118 strike together is cushioned by the elastic support cylinder portion 64 and the rubber elastic support 58 along the path of transmission to the vehicle body 20. Consequently, noise resulting from transmission of this impact force to the vehicle body 20 can be effectively reduced. Moreover, because the partition member body 50 is fitted together with the second mounting member 14 via the seal rubber layer 40, noise produced by the valve-like rubber projections 112, 116 and the cushioning projections 114, 118 striking together will be cushioned and reduced by the seal rubber layer 40.

At times of input of low-frequency, large-amplitude vibration, minute displacement of the moveable dividing wall 54 and the partition member 48 in the axial direction is limited by the fact that the resonance frequency of the mass-spring system (the natural frequency of the moveable dividing wall 54) has been tuned to a higher frequency. Additionally, the annular rubber plate 86 is held pressed against the base plate member 76 by the urging force of the coil spring 88, and blocks the lower short circuiting holes 84. Thus, a sufficient level of fluid flow through the low-frequency orifice passage 100 is more advantageously assured, and the intended vibration damping action is effectively achieved.

With the automotive engine mount 10 installed in a vehicle, at times of input of midrange-frequency, small- to medium-amplitude vibration corresponding to idling vibration, relative pressure fluctuations of the pressure-receiving chamber 90 and the middle chamber 94 give rise to fluid flow through the midrange-frequency orifice passage 104 between the pressure-receiving chamber 90 and the middle chamber 94. Vibration damping action is produced thereby on the basis of flow action of the fluid (low dynamic spring action).

Also, at times of input of midrange-frequency, small- to medium-amplitude vibration, the low-frequency orifice passage 100 becomes substantially blocked through antiresonance action, while the high-frequency orifice passages 126 are maintained in the open state. Fluid pressure absorption through minute displacement of the moveable dividing wall 54 and the partition member 48 is prevented, and the one-way valve is held in the blocked state. A sufficient level of fluid flow through the midrange-frequency orifice passage 104 is advantageously assured thereby, so that the intended vibration damping action may be effectively achieved.

The end of the low-frequency orifice passage 100 at the pressure-receiving chamber 90 end thereof is incorporated to form the midrange-frequency orifice passage 104. For this reason, the orifice passages 100, 104 can be formed with good space efficiency, and with a high degree of freedom in terms of design of the orifice passages 100, 104.

With the automotive engine mount 10 installed in a vehicle, at times of input of high-frequency, small-amplitude vibration corresponding to lockup rumble, fluid pressure arising in the pressure-receiving chamber 90 due to minute deformation of the elastic moveable film 52 is transmitted to the middle chamber 94. Then, on the basis of relative pressure fluctuations of the middle chamber 94 and the equilibrium chamber 92, active fluid flow is produced through the high-frequency orifice passages 126 between the middle chamber 94 and the equilibrium chamber 92. Vibration damping action is produced thereby on the basis of flow action of the fluid (low dynamic spring action).

Also, at times of input of high-frequency, small-amplitude vibration, both the low-frequency orifice passage 100 and the midrange-frequency orifice passage 104 become substantially blocked due to antiresonance. Fluid pressure absorption through minute displacement of the moveable dividing wall 54 and the partition member 48 is prevented, and the one-way valve is held in the blocked state. A fluid flow through the high-frequency orifice passages 126 is produced efficiently as a result, and the intended vibration damping action may be effectively achieved.

Furthermore, with the automotive engine mount 10 installed in a vehicle, at times of input of minute-amplitude vibration of even higher frequency corresponding to high speed rumble, fluid pressure of the pressure-receiving chamber 90 is transmitted to the middle chamber 94 by elastic deformation of the elastic moveable film 52. As a result, relative pressure fluctuations arise between the middle chamber 94 and the equilibrium chamber 92, and the moveable dividing wall 54 experiences minute displacement in the axial direction due to elastic deformation of the rubber elastic support 58 and elastic deformation of the elastic support cylinder portion 64 which has been integrally formed with the outside peripheral edge part of the elastic moveable film 52. Effective vibration damping action (low dynamic spring action) is then produced through cancelling action resulting from displacement of the moveable dividing wall 54 in the resonance state.

Moreover, because the additional vibrating subsystem including the partition member 48 and the seal rubber layer 40 has been devised, relative pressure fluctuations of the pressure-receiving chamber 90 and the equilibrium chamber 92 give rise to vibration energy-absorbing action through resonance action of this additional vibrating subsystem. There is attained as a result the serial two-degree-of-freedom system vibration model composed of the vibrating subsystem that includes the moveable dividing wall 54 and the rubber elastic support 58, and the vibrating subsystem that includes the partition member 48 and the seal rubber layer 40, making it possible to achieve better damping action and freedom in tuning.

Meanwhile, in the event that a strong vibration load is input across the first mounting member 12 and the second mounting member 14 due for example to driving over a bump, resulting in a sharp drop in pressure of the pressure-receiving chamber 90, the annular rubber plate 86 which has been arranged at the center of the moveable dividing wall 54 becomes displaced towards the middle chamber 94 side in opposition to the urging force of the coil spring 88, and separates from the base plate member 76. The lower short circuiting holes 84 are thus released from the state of being blocked by the annular rubber plate 86, thereby placing the middle chamber 94 and the equilibrium chamber 92 in communication through the upper short circuiting holes 82 and the lower short circuiting holes 84 of the moveable dividing wall 54, and the center hole of the annular rubber plate 86. As a result, negative pressure transmitted from the pressure-receiving chamber 90 to the middle chamber 94 is dissipated as expeditiously as possible through inflow of fluid from the equilibrium chamber 92, so that cavitation noise caused by negative pressure of the pressure-receiving chamber 90 can be reduced or prevented.

Once negative pressure of the pressure-receiving chamber 90 has dissipated, the annular rubber plate 86 is pressed against the base plate member 76 due to the urging force of the coil spring 88, again blocking the lower short circuiting holes 84. In the present embodiment, the annular rubber plate 86 is positioned accommodated inside the moveable dividing wall 54. For this reason, impact force arising from striking of the annular rubber plate 86 is cushioned by the cushioned by the elastic support cylinder portion 64, the rubber elastic support 58, and the seal rubber layer 40 along the path of transmission to the vehicle body 20, and striking noise resulting from striking of the annular rubber plate 86 is reduced or prevented. Moreover, because the annular rubber plate 86 constituting the valve body is formed by a rubber elastic body, noise produced during striking will be reduced through cushioning afforded by elastic deformation of the annular rubber plate 86 as well.

In the automotive engine mount 10, the elastic moveable film 52 and the passage-defining rubber part 106 are formed by rubber elastic bodies, and are arranged in the center hole of the rigid partition member body 50. For this reason, the elastic moveable film 52 and the passage-defining rubber part 106 can be easily attached at a prescribed location of second mounting member 14 simply by securing the partition member body 50 fitting together with the second mounting member 14.

Figure 4:
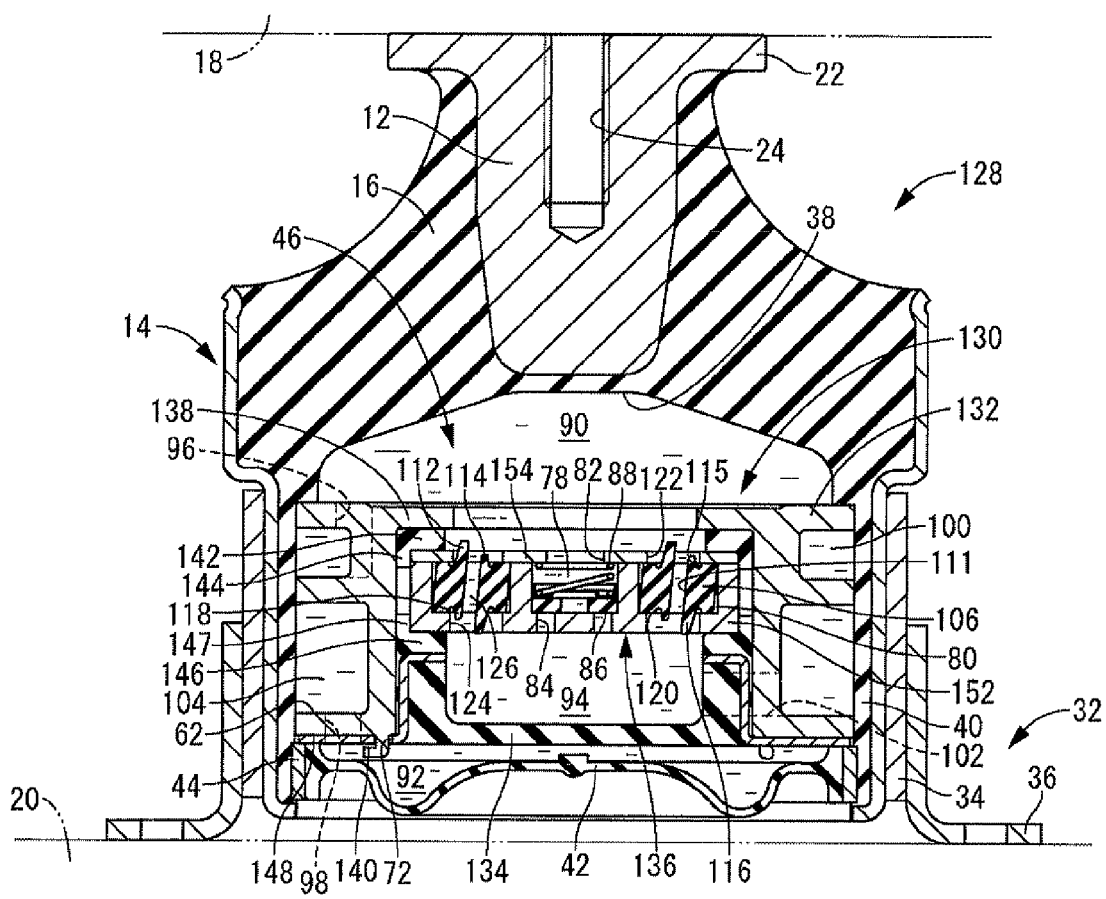
FIG. 4 is a longitudinal cross sectional view of an automotive engine mount according to a second embodiment of the present invention.

Next, FIG. 4 depicts an automotive engine mount 128 according to a second embodiment of the fluid-filled type vibration damping device constructed according to the invention. In the following description, parts and components substantially identical to those in the preceding first embodiment are assigned like symbols in the drawing and are not discussed in any detail.

Turning to a more detailed discussion, the automotive engine mount 128 is furnished with a partition member 130. The partition member 130 includes a partition member body 132, an elastic moveable film 134, and a moveable dividing wall 136. The partition member body 132 has a structure equivalent to inverting top to bottom the partition member body 50 of the first embodiment, with a support piece 138 corresponding to the support piece 56 integrally formed at the upper end, and a catch hook 140 corresponding to the catch hook 70 integrally formed at the bottom end. A rubber elastic support 142 having generally annular disk shape is juxtaposed against the bottom face of the support piece 138, and an upper outside peripheral support portion 144 that projects downward is integrally formed at the outside peripheral edge part of the rubber elastic support 142.

The elastic moveable film 134 is positioned in the lower opening of the center hole of the partition member body 132. The elastic moveable film 134 has a structure equivalent to inverting top to bottom the elastic moveable film 52 of the first embodiment, with an elastic support cylinder portion 146 corresponding to the elastic support cylinder portion 64 projecting towards the top, and with a lower outside peripheral support portion 147 that projects towards the top integrally formed in the outside peripheral edge part of the elastic support cylinder portion 146. A support fitting 148 having a structure equivalent to inverting top to bottom the support fitting 68 of the first embodiment is anchored to the elastic moveable film 134. The center section of the support fitting 148 is embedded and vulcanization bonded to the elastic support cylinder portion 146 of the elastic moveable film 134 so that the elastic moveable film 134 takes the form of an integrally vulcanization molded component incorporating the support fitting 148. The elastic moveable film 134 having this construction is attached to the partition member body 132 by juxtaposing the outside peripheral section of the support fitting 148 against the bottom face of the partition member body 132 and securing it in place through locking of the catch hook 140 and the catch hole 72.

The moveable dividing wall 136 is positioned between the axially opposed faces of the rubber elastic support 142 and the elastic support cylinder portion 146. The moveable dividing wall 136 has a construction in which a cover plate member 154 of circular disk shape is juxtaposed from above against a thick dividing wall body 152 resembling a Petri dish in shape. The moveable dividing wall 136 is installed in the partition member body 132 with its outside peripheral edge part elastically supported between the rubber elastic support 142 and the elastic support cylinder portion 146.

The partition member 130 having the above construction is arranged inside the fluid chamber 46, and the partition member body 132 is secured fitting into the second mounting member 14. A pressure-receiving chamber 90 and an equilibrium chamber 92 are thereby defined to either side of the partition member 130, and a middle chamber 94 is defined in the interior of the partition member 130. In the present embodiment, the pressure-receiving chamber 90 and the middle chamber 94 are separated by the moveable dividing wall 136, while the middle chamber 94 and the equilibrium chamber 92 are separated by the elastic moveable film 134. A midrange-frequency orifice passage 104 tuned to a midrange frequency corresponding to idling vibration is formed so as to connect the middle chamber 94 and the equilibrium chamber 92.

There is constituted a dynamic damper that includes the moveable dividing wall 136 as the mass system and includes the rubber elastic support 142 and the elastic support cylinder portion 146 as the spring system; the natural frequency of the moveable dividing wall 136 is tuned to a midrange frequency corresponding to idling vibration. Fluid pressure fluctuations arising from input of high-frequency vibration corresponding to lockup rumble are transmitted between the middle chamber 94 and the equilibrium chamber 92 through elastic deformation of the elastic moveable film 134.

An annular rubber plate 86 and a coil spring 88 are arranged in a central receptacle area 78, with the annular rubber plate 86 and the coil spring 88 constituting a one-way valve. Meanwhile, a passage-defining rubber part 106 is arranged in the outside peripheral receptacle area 80, and several high-frequency orifice passages 126 are formed incorporating communication holes 111 in the passage-defining rubber part 106. The high-frequency orifice passages 126 are tuned to high frequency corresponding to lockup rumble.

With the automotive engine mount 128 constructed in the above manner installed in a vehicle, when low-frequency, large-amplitude vibration corresponding to engine shake is input, vibration damping action is produced by fluid flow through the low-frequency orifice passage 100. At times of input of midrange-frequency, small- to medium-amplitude vibration corresponding to idling vibration on the other hand, pressure of the pressure-receiving chamber 90 is transmitted to the middle chamber 94 through displacement of the moveable dividing wall 136, and vibration damping action is produced by fluid flow through the midrange-frequency orifice passage 104.

At times of input of low-frequency, large-amplitude vibration, the upper and lower valve-like rubber projections 112, 116 undergo elastic deformation bending towards the communication holes 111 under the action of fluid pressure so that the high-frequency orifice passages 126 become blocked by the valve-like rubber projections 112, 116. Relative pressure fluctuations of the pressure-receiving chamber 90 and the equilibrium chamber 92 are efficiently produced thereby, so as to achieve vibration damping action on the part of the low-frequency orifice passage 100.

At times of input of high-frequency, small-amplitude vibration corresponding to lockup rumble, deformation of the upper and lower valve-like rubber projections 112, 116 abates or ceases completely, and the high-frequency orifice passages 126 switch to the open state. Fluid pressure of the middle chamber 94 is transmitted to the equilibrium chamber 92 through minute elastic deformation of the elastic moveable film 134. Fluid flow is produced through the high-frequency orifice passages 126 as a result, and the flow action of the fluid gives rise to vibration damping action. Also, at times of input of high-frequency vibration corresponding to lockup rumble, the low-frequency orifice passage 100 and the midrange-frequency orifice passage 104 assume the blocked state due to antiresonance action so that fluid flow is produced efficiently through the high-frequency orifice passages 126.

Figure 5:
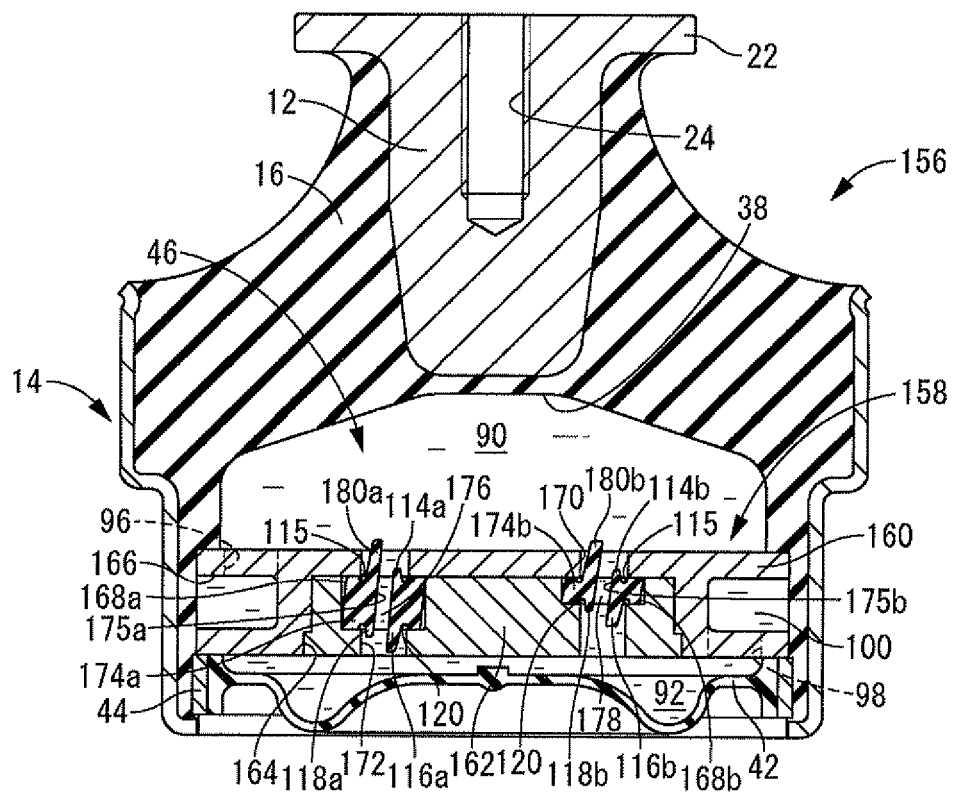
FIG. 5 is a longitudinal cross sectional view of an automotive engine mount according to a third embodiment of the present invention.

Next, FIG. 5 depicts an automotive engine mount 156 according to a third embodiment of the fluid-filled type vibration damping device constructed according to the invention. The automotive engine mount 156 has a partition member 158, and the partition member 158 includes a partition member body 160 and a receptacle member 162.

The partition member body 160 is generally circular disk shaped overall, and has a circular center recess 164 that opens onto the bottom face. In the outside peripheral section of the partition member body 160 there is formed a circumferential groove 166 opening onto its outside peripheral face while extending for a prescribed length in the circumferential direction.

The circular disk-shaped receptacle member 162 is installed in the center recess 164 of the partition member body 160. A pair of receptacle recesses are formed in the outside peripheral section of this receptacle member 162 in areas thereof situated in opposition along a diametrical axis, and open onto the top face. By fitting the receptacle member 162 into the center recess 164 of the partition member body 160, the openings of the receptacle recesses are covered by the center section of the partition member body 160, thereby forming receptacle areas 168a, 168b. Upper passage holes 170 respectively pass through the upper base walls of the receptacle areas 168a, 168b; and lower passage holes 172 respectively pass through the lower base walls of the receptacle areas 168a, 168b. The receptacle area 168a and the receptacle area 168b are identical in shape in plan view, but their axial dimensions differ from one another, with the axial dimension of the receptacle area 168a being larger than the axial dimension of the receptacle area 168b.

The partition member 158 having this construction is arranged inside the fluid chamber 46 and is supported by the second mounting member 14. A pressure-receiving chamber 90 and an equilibrium chamber 92 filled with a noncompressible fluid are formed to either side of the partition member 158. The opening of the circumferential groove 166 is covered by the second mounting member 14, thereby forming a low-frequency orifice passage 100 that connects the pressure-receiving chamber 90 and the equilibrium chamber 92 to one another. The low-frequency orifice passage 100 is tuned to a frequency corresponding to engine shake.

Here, a passage-defining rubber part 174a is arranged in the receptacle area 168a, and a passage-defining rubber part 174b is arranged in the receptacle area 168b. The passage-defining rubber parts 174 have generally oblong block shape overall, and the thickness dimension of the passage-defining rubber part 174a in the axial direction is greater than the thickness dimension of the passage-defining rubber part 174b in the axial direction.

Communication holes 175 are formed extending along straight lines passing through the center section of the passage-defining rubber parts 174. The communication holes 175 are generally identical in terms of their basic construction to the communication holes 111 shown in the preceding first embodiment, but the dimension of the communication hole 175a in the hole passage direction is greater than the dimension of the communication hole 175b in the hole passage direction.

The communication holes 175 communicate at one opening thereof with the pressure-receiving chamber 90 through the upper passage holes 170, and communicate at the other opening with the equilibrium chamber 92 through the lower passage holes 172. Thus, a first high-frequency orifice passage 176 is formed incorporating the communication hole 175a, and a second high-frequency orifice passage 178 is formed incorporating the communication hole 175b. The first high-frequency orifice passage 176 is tuned to midrange-frequency, small- to medium-amplitude vibration corresponding to idling vibration, while the second high-frequency orifice passage 178 is tuned to high-frequency, small-amplitude vibration corresponding to driving rumble. That is, the automotive engine mount 156 has two high-frequency orifice passages formed therein, with these high-frequency orifice passages having mutually different tuning frequencies.

To one widthwise side (the left side in FIG. 5) of each communication hole 175 in the passage-defining rubber part 174 there are integrally formed an upper valve-like rubber projection 180 that projects upward and a lower cushioning projection 118 that projects downward. To the other widthwise side of the communication hole 175 there are integrally formed an upper cushioning projection 114 that projects upward and a lower valve-like rubber projection 116 that projects downward.

In other words, at the opening on the pressure-receiving chamber 90 side of the first high-frequency orifice passage 176, an upper valve-like rubber projection 180a and an upper cushioning projection 114a are arranged to either side of the communication hole 175a; while at the opening on the equilibrium chamber 92 side of the first high-frequency orifice passage 176, a lower valve-like rubber projection 116a and a lower cushioning projection 118a are arranged to either side of the communication hole 175a. Meanwhile, at the opening on the pressure-receiving chamber 90 side of the second high-frequency orifice passage 178, an upper valve-like rubber projection 180b and an upper cushioning projection 114b are arranged to either side of the communication hole 175b; while at the opening on the equilibrium chamber 92 side of the second high-frequency orifice passage 178, a lower valve-like rubber projection 116b and a lower cushioning projection 118b are arranged to either side of the communication hole 175b. The upper valve-like rubber projections 180 are generally identical in construction to the upper valve-like rubber projections 112 in the preceding first embodiment, so their basic construction will not be discussed.

The upper valve-like rubber projection 180*a* is thinner than the upper valve-like rubber projection 180*b* in the direction of opposition of the pair of communication holes 175*a*, 175*b*. Thus, the upper valve-like rubber projection 180*a* and the upper valve-like rubber projection 180*b* have different spring constants, and the upper valve-like rubber projection 180*a* is more readily deformed than the upper valve-like rubber projection 180*b*. Meanwhile, the lower valve-like rubber projection 116*a* is thinner than the lower valve-like rubber projection 116*b*. Thus, the lower valve-like rubber projection 116*a* and the lower valve-like rubber projection 116*b* have different spring constants, and the lower valve-like rubber projection 116*a* is more readily deformed than the lower valve-like rubber projection 116*b*.

The upper valve-like rubber projections 180 have greater projecting dimension than the lower valve-like rubber projections 116. Thus, the upper valve-like rubber projections 180 more readily undergo elastic deformation than do the lower valve-like rubber projections 116. Also, the through-thickness dimension of the upper valve-like rubber projections 180 may be made smaller than the through-thickness dimension of the lower valve-like rubber projections 116. That is, the upper valve-like rubber projections 180 and the lower valve-like rubber projections 116 have different spring constants owing to their different cross-sectional shapes; and due to the different spring constants of the upper valve-like rubber projections 180 and the lower valve-like rubber projections 116, the conditions under which the upper valve-like rubber projections 180 elastically deform to block the first and second high-frequency orifice passages 176, 178 are different from the conditions under which the lower valve-like rubber projections 116 elastically deform to block the first and second high-frequency orifice passages 176, 178.

With the automotive engine mount 156 constructed according to the present embodiment installed in a vehicle, when vibration of frequency corresponding to engine shake is input, the intended vibration damping action is produced based on fluid flow through the low-frequency orifice passage 100.

At times of input of vibration of frequency equal to or lower than the tuning frequency of the low-frequency orifice passage 100, the upper and lower valve-like rubber projections 180, 116 are urged into elastic deformation towards the communication holes 175, blocking off the first and second high-frequency orifice passages 176, 178. Thus, a sufficient level of fluid flow through the low-frequency orifice passage 100 is assured, and effective vibration damping action can be produced.

At times of input of vibration of midrange frequency corresponding to idling vibration, deformation of the upper and lower valve-like rubber projections 180*a*, 116*a* abates or ceases completely, and the first high-frequency orifice passage 176 switches to the open state. The intended vibration damping action is thereby produced on the basis of fluid flow through the first high-frequency orifice passage 176. Also, at times of input of vibration of midrange frequency, the second high-frequency orifice passage 178 is held in the blocked state to ensure an ample level of fluid flow in the first high-frequency orifice passage 176. As a specific example, by giving the upper and lower valve-like rubber projections 180*a*, 116*a* different cross-sectional shape or making them of different materials than the upper and lower valve-like rubber projections 180*b*, 116*b* so that their conditions for blocking the passages, e.g. their spring constants, differ from one another, it will be possible for the first high-frequency orifice passage 176 to assume the open state and the second high-frequency orifice passage 178 to assumed the blocked state at the same time.

At times of input of high-frequency, small-amplitude vibration corresponding to driving rumble, deformation of the upper and lower valve-like rubber projections 180, 116 abates or ceases completely, and the second high-frequency orifice passage 178 switches to the open state. The intended vibration damping action is thereby produced on the basis of fluid flow through the second high-frequency orifice passage 178. The low-frequency orifice passage 100 and the first high-frequency orifice passage 176 become substantially blocked by antiresonance action.

The upper valve-like rubber projections 180 that project out towards the pressure-receiving chamber 90 side have greater projecting dimension than the lower valve-like rubber projections 116 that project out towards the equilibrium chamber 92 side. Thus, elastic deformation of the upper valve-like rubber projections 180 takes place more readily than does elastic deformation of the lower valve-like rubber projections 116. Accordingly, closing operation conditions (i.e. the magnitude of outside force required to actuate the closing operation) for the upper valve-like rubber projections 180 are different from the closing operation conditions for the lower valve-like rubber projections 116. For this reason, fluid flow from the equilibrium chamber 92 into the pressure-receiving chamber 90 takes place more readily than does fluid flow from the pressure-receiving chamber 90 into the equilibrium chamber 92, so that the pressure-receiving chamber 90 is readily kept at higher pressure than the equilibrium chamber 92. As a result, drops in internal pressure of the pressure-receiving chamber 90 caused by input of impact-induced vibration load can be ameliorated, and cavitation can be prevented.

Figure 6:
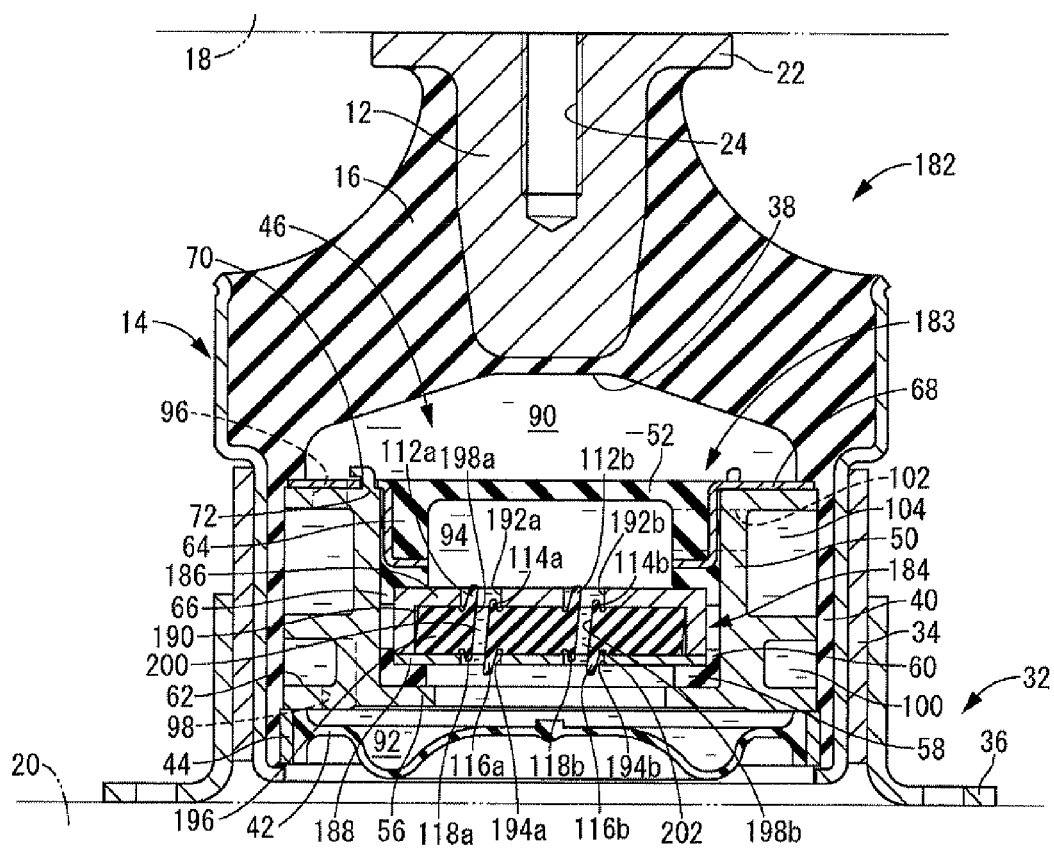
FIG. 6 is a longitudinal cross sectional view of an automotive engine mount according to a fourth embodiment of the present invention.

Next, FIG. 6 depicts an automotive engine mount 182 according to a fourth embodiment of the fluid-filled type vibration damping device constructed according to the invention. The basic construction of the automotive engine mount 182 is comparable to that of the automotive engine mount 10 of the preceding first embodiment, but a partition member 183 is employed in place of the partition member 48. In place of the moveable dividing wall 54, a moveable dividing wall 184 is arranged on the partition member 183.

The moveable dividing wall 184 has a dividing wall body 186 of inverted, shallow saucer shape, and a base plate member 188 of circular disk shape disposed covering the opening of the dividing wall body 186, giving it a hollow circular disk shape overall.

A round cylindrical receptacle area 190 is defined between the dividing wall body 186 and the base plate member 188. An upper passage hole 192*a* and an upper passage hole 192*b* are formed in the wall at the axial upper end of this receptacle area 190, and extend parallel to one another along an axis in the axis-perpendicular direction. The upper passage hole 192*a* and the upper passage hole 192*b* both have generally oblong shape elongated in plan view, and pass through the upper base wall of the dividing wall body 186. The upper passage hole 192*a* has a shorter length dimension in the lengthwise direction than does the upper passage hole 192*b*. Meanwhile, in the wall at the axial lower side of the receptacle area 190, a lower passage hole 194*a* is formed at a location corresponding to the upper passage hole 192*a*, and a lower passage hole 194*b* is formed at a location corresponding to the upper passage hole 192*b*. The upper passage hole 192*a* and the lower passage hole 194*a* have generally identical hole cross-sectional contours, and likewise the upper passage hole 192b and the lower passage hole 194b have generally identical hole cross-sectional contours.

Figure 7:
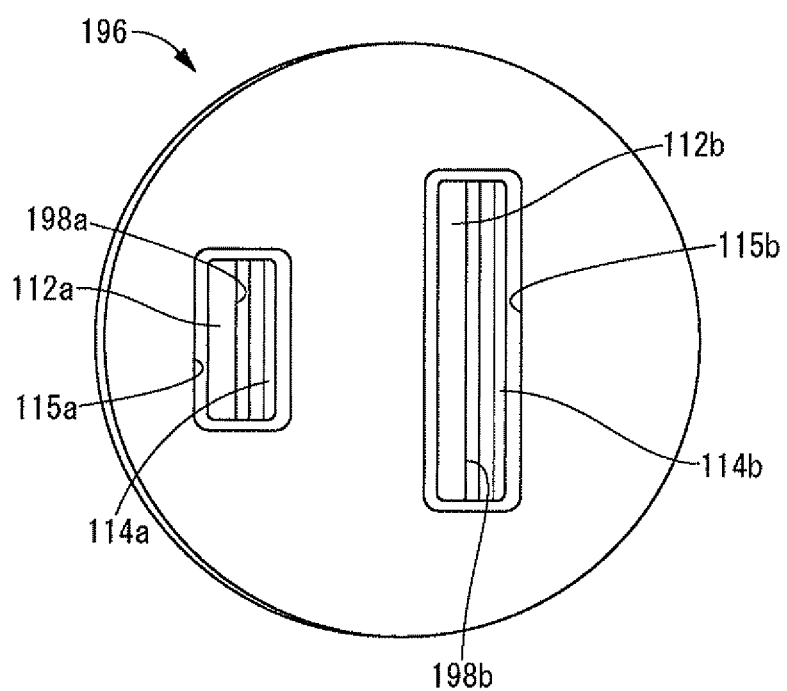
FIG. 7 is a plan view of the passage-defining rubber part of the engine mount shown in FIG. 6.

The receptacle area 190 accommodates a passage-defining rubber part 196. As depicted in FIGS. 6 and 7, the passage-defining rubber part 196 is generally circular disk shaped and is provided with a communication hole 198a and a communication hole 198b. The communication hole 198a and the communication hole 198b each pass in the thickness direction through the passage-defining rubber part 196, and in plan view are elongated along an axis lying in the axis-perpendicular direction, and are formed extending parallel to one another and spaced apart by a prescribed distance. The communication hole 198a has a smaller lengthwise dimension in the lengthwise direction than does the communication hole 198b. Additionally, the communication hole 198a is positioned closer to the outside perimeter of the component than is the communication hole 198b, with reference to the axis-perpendicular direction of opposition thereof to the communication hole 198b (the horizontal direction in FIG. 7). Like the communication holes 111 of the first embodiment, the communication holes 198a, 198b pass through the passage-defining rubber part 196 on an incline in the same direction as one another.

As in the preceding first embodiment, upper and lower valve-like rubber projections 112, 116 and upper and lower cushioning projections 114, 118 are respectively formed to either widthwise side of the communication hole 198a and the communication hole 198b. The upper and lower valve-like rubber projections 112a, 116a and the upper and lower cushioning projections 114a, 118a that are formed to either widthwise side of the communication hole 198a have shorter length dimension in the lengthwise direction of the communication holes 198 (the vertical direction in FIG. 7) than do the upper and lower valve-like rubber projections 112b, 116b and the upper and lower cushioning projections 114b, 118b that are formed to either widthwise side of the communication hole 198b.

The moveable dividing wall 184 is formed by positioning the passage-defining rubber part 196 in the receptacle area 190. Like the moveable dividing wall 54 of the first embodiment, the moveable dividing wall 184 is elastically supported between a rubber elastic support 58 and an elastic support cylinder portion 64. The communication hole 198a and the communication hole 198b formed in the passage-defining rubber part 196 thereby communicate respectively with the equilibrium chamber 92 and the middle chamber 94 via upper and lower passage holes 192, 194, with a first high-frequency orifice passage 200 connecting the equilibrium chamber 92 and the middle chamber 94 to one another being formed by the communication hole 198a, and a second high-frequency orifice passage 202 connecting the equilibrium chamber 92 and the middle chamber 94 to one another being formed by the communication hole 198b. The high-frequency orifice passages of the present embodiment are constituted by these first and second high-frequency orifice passages 200, 202. The first high-frequency orifice passage 200 has identical passage length but smaller passage cross sectional area relative to the second high-frequency orifice passage 202, and its tuning frequency is set to a lower frequency.

According to the automotive engine mount 182 constructed in this way, vibration damping action of low- to midrange-frequency vibration is produced by the low-frequency orifice passage 100 and the midrange-frequency orifice passage 104, while vibration damping action of high-frequency vibration is produced by the first and second high-frequency orifice passages 200, 202. In particular, by tuning the first and second high-frequency orifice passages 200, 202 to mutually different frequencies, the orifice passages 200, 202 can provide vibration damping action of several types of vibration of different frequencies in the high-frequency range, thus affording enhanced vibration damping capabilities of vibration in the high-frequency range.

The passage-defining rubber part 196 is of circular disk shape lacking a center hole. For this reason, there is greater freedom of selection of the location and number of communication holes, making it possible to obtain an engine mount that more closely conforms to the intended vibration damping characteristics.

Figure 8:
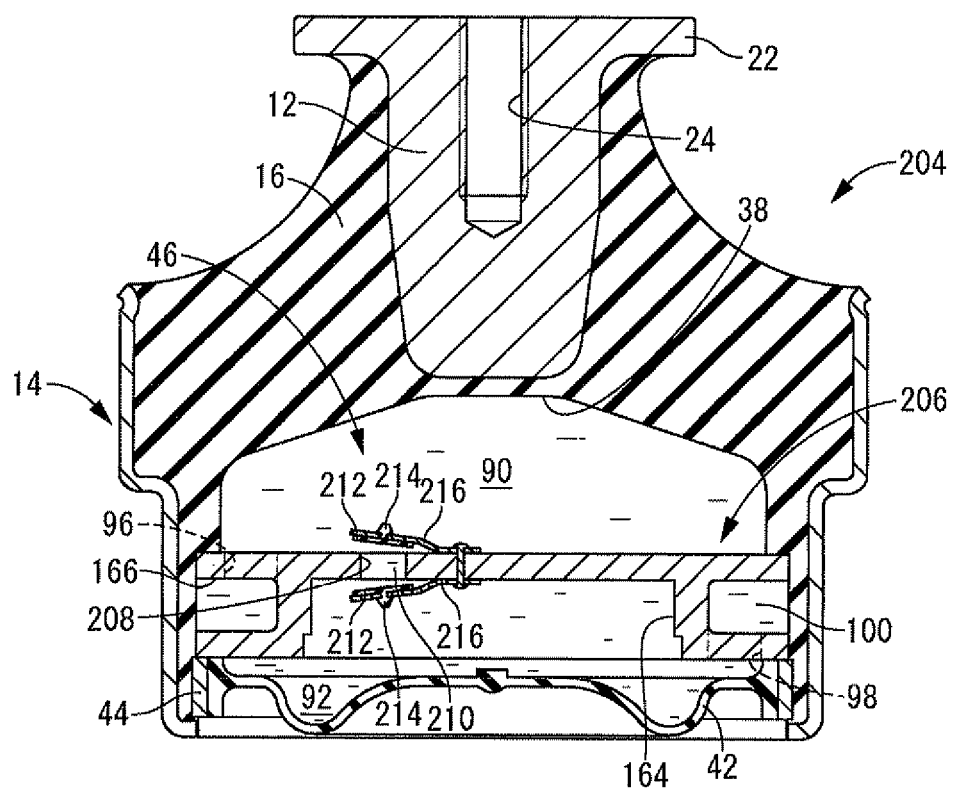
FIG. 8 is a longitudinal cross sectional view of an automotive engine mount according to a fifth embodiment of the present invention.

Next, FIG. 8 depicts an automotive engine mount 204 according to a fifth embodiment of the fluid-filled type vibration damping device constructed according to the invention. The automotive engine mount 204 has a structure comparable to that of the automotive engine mount 156 of the preceding third embodiment, so the same drawing symbols are assigned without further description.

The automotive engine mount 204 has a partition member 206. The partition member 206 is constructed generally identically to the partition member body 160 in the preceding embodiments, with a communication hole 208 formed in the diametrical medial section thereof and passing in the axial direction through the upper base wall of a center recess 164. One opening of the communication hole 208 communicates with the pressure-receiving chamber 90, while the other opening communicates with the equilibrium chamber 92 so that a high-frequency orifice passage 210 is defined by the communication hole 208. The high-frequency orifice passage 210 is tuned to a frequency corresponding to idling vibration.

Rubber plate valves 212 provided as valve bodies are arranged at the openings of the high-frequency orifice passage 210. The rubber plate valves 212 are rubber elastic bodies of generally circular disk shape larger in diameter than the diameter of the communication hole 208. A catch portion 214 integrally fowled on the rubber plate valve 212 juts out to the opposite side from the partition member 206 in the through-thickness direction. The catch portion 214 has an integral construction incorporating a distal end section of generally truncated conical shape progressively smaller in diameter towards the projecting distal end, and a connecting part of circular post shape smaller in diameter than the basal end part of the distal end section and connecting the rubber plate valve 212 with the basal end side of the distal end section.

The rubber plate valve 212 is supported by a plate spring 216 provided as a spring member. The plate spring 216 is a metal piece having elongated plate shape, to one lengthwise end of which the rubber plate valve 212 is secured, while the other lengthwise end is secured to the partition member 206. The rubber plate valve 212 is thereby elastically supported on the partition member 206 via the plate spring 216. The lengthwise medial section of the plate spring 216 is provided with a sloping part, and in the nonloaded state in the absence of applied external force, the rubber plate valve 212 anchored to a lengthwise end of the plate spring 216 is positioned spaced apart from partition member 206 in the axial direction. Through elastic deformation of the plate spring 216, displacement of the rubber plate valve 212 is permitted in the directions towards and away from the opening of the high-frequency orifice passage 210. While imposing no particular limitation as to the fastening means for fastening the plate spring 216 to the partition member 206, means such as rivet or screw fastening, adhesive bonding, or welding could be employed. The rubber plate valve 212 is secured to the plate spring 216 by the catch portion 214, but could instead be secured through means such as vulcanization bonding.

The pair of rubber plate valves 212, 212 are positioned spaced apart facing the two openings of the high-frequency orifice passage 210, and are elastically supported respectively by the independent plate springs 216, 216. That is, the pair of plate springs 216, 216 respectively provided to the rubber plate valves 212 are attached to both faces of the partition member 206.

With the automotive engine mount 204 constructed in accordance with the present embodiment, at times of input of vibration of a frequency range corresponding to engine shake, vibration damping action is produced on the basis of fluid flow through the low-frequency orifice passage 100, while at times of input of vibration of a frequency range corresponding to idling vibration, vibration damping action is produced on the basis of fluid flow through the high-frequency orifice passage 210.

When vibration of a frequency corresponding to engine shake is input, due to the action of pressure of the pressure-receiving chamber 90 or the equilibrium chamber 92, or of negative pressure arising from the flow velocity of fluid inflowing through the communication hole 208, the plate spring 216 experiences elastic deformation and positions the rubber plate valve 212 closer towards the opening of the high-frequency orifice passage 210. This assures that relative pressure fluctuations of the pressure-receiving chamber 90 and the equilibrium chamber 92 arise efficiently so as to advantageously afford vibration damping action by the low-frequency orifice passage 100.

Moreover, because the spring member is composed of a metal plate spring 216, durability of the spring member can be improved, and sufficient dependability can be assured in the face of repeated operation. Further, because metal has much lower attenuation in comparison with a rubber elastic body, the valve body is able to operate rapidly so as to advantageously afford vibration damping action by the low-frequency orifice passage 100. Additionally, by employing a combination of a metal spring member (the plate spring 216) and a valve body made of a rubber elastic body (the rubber plate valve 212), the advantages of a rubber valve can be obtained while enjoying the advantages of a metal spring mentioned above. Specifically, striking noise occurring when the high-frequency orifice passage 210 becomes blocked can be minimized due to the cushioning action of the rubber plate valve 212, while the high-frequency orifice passage 210 can be dependably blocked off through intimate contact made possible by elastic deformation of the rubber plate valve 212.

While the present invention has been shown in terms of certain preferred embodiments, the invention should not be construed as limited to the specific disclosure herein. For example, whereas the preceding first to fifth embodiments show constructions in which valve bodies are respectively arranged at both the pressure-receiving chamber side and the equilibrium chamber side, a valve body may be provided on one side only, such as providing the valve body on the pressure-receiving chamber side only, for example. Through such an arrangement, fluid inflow through the high-frequency orifice passage from the equilibrium chamber side towards the pressure-receiving chamber side takes place more advantageously than does fluid inflow from the pressure-receiving chamber side towards the equilibrium chamber side. Fluid pressure of the pressure-receiving chamber is thereby set to a relatively high level with respect to fluid pressure of the equilibrium chamber, thereby preventing noise caused by negative pressure in the pressure-receiving chamber.

While the preceding first to fourth embodiments show constructions in which a pair of communication holes are positioned in opposition along a diametrical axis, it would be possible to instead form only a single communication hole or three or more communication holes for example, and to provide the appropriate number of corresponding valve bodies and spring members. Even where two communication holes are provided as taught in the first to fourth embodiments, it is not essential for the two communication holes to be formed at opposing locations along a diametrical axis.

While the preceding first to fourth embodiments show constructions in which the upper and lower valve-like rubber projections are inclined towards the communication hole side beforehand, the valve-like rubber projections may instead be shaped such that their projection direction extends parallel to the axial direction of the mount. However, in order to achieve dependable closing operation of high-frequency orifice passages by the valve-like rubber projections, it is preferable to design the valve-like rubber projections with their elastic principal axis which extends in the projection direction gradually inclined towards the communication hole side going towards the projecting distal end. More preferably, like the upper and lower valve-like rubber projections shown in the first to fourth embodiments, both the face lying towards the communication hole and the face on the opposite side from the communication hole thereof are constituted by sloping faces that gradually incline towards the communication hole side going towards the projecting distal end.

In yet another exemplary arrangement, a valve-like rubber projection that projects towards the pressure-receiving chamber 90 side from the rim of the opening of the circular hole 208 is anchored directly onto the upper face of the partition member 206 shown in the fifth embodiment, so that the circular hole 208 becomes blocked through elastic deformation of the valve-like rubber projection.

In the preceding first to fourth embodiments, the communication holes are communication holes that extend in a straight line; however, communication holes that curve in the circumferential direction or communication holes that follow a sinuous path may be adopted as well. While the communication holes herein are inclined with respect to the axial direction, such incline is not essential.

In the preceding first to fourth embodiments, a valve-like rubber projection (valve body) is situated to only one side of the communication hole; however, valve-like rubber projections could be formed to either side so that the high-frequency orifice passage becomes blocked through elastic deformation of the valve-like rubber projections respectively situated at both sides of the communication hole.

In the preceding third embodiment, upper valve-like rubber projections 112 and upper valve-like rubber projections 180 are provided, and due to the different spring constants that result from the different cross sectional shapes of these upper valve-like rubber projections 112, 180, conditions for blocking the first high-frequency orifice passage 176 and conditions for blocking the second high-frequency orifice passage 178 differ from one another; however, closing conditions for a plurality of high-frequency orifice passages could instead be differentiated from one another by positioning valve-like rubber projections of identical cross sectional shape at different distances from the communication holes in the nonloaded state. Closing conditions may also be differentiated by using different materials to form valve-like rubber projections of identical shape, for example.

It is not essential that the communication holes become completely blocked during closing operation of the valve body. For example, It is acceptable for the valve body to move in opposition to the urging force of spring member to a location in proximity to the communication hole and facing it across a tiny gap so as to produce a very high level of flow resistance in the constricted zone (gap) formed between the valve body and the communication hole, thereby holding the communication hole in the substantially blocked state.

In the preceding first, second, and fourth embodiments, part of the low-frequency orifice passage 100 is employed to form the midrange-frequency orifice passage 104; however, the midrange-frequency orifice passage 104 may be formed completely independently of the low-frequency orifice passage 100.

The short circuiting mechanism (one-way valve) composed of the annular rubber plate 86 and the coil spring 88 shown in the first and second embodiments is not essential. The urging means for the pressure escape valve is not limited to a coil spring of metal, and it would be possible to use a synthetic resin having elasticity (such as rubber), or a plate spring or the like. Besides a rubber elastic body, it is possible to use a rigid material, such as metal or resin, for the pressure escape valve.

In the preceding first, second, and fourth embodiments, the moveable dividing wall 54 (184) and the rubber elastic support 58 (142) make up a dynamic damper, the partition member 48 (183) and the seal rubber layer 40 make up an additional dynamic damper, in order to further improve freedom of tuning and to enhance vibration damping action of input vibration of a high-frequency range; however, these dynamic damper arrangements are not essential. In an alternative arrangement for example, the natural frequencies of the moveable dividing wall 54 (184) and the partition member 48 (183) are tuned to frequency ranges deviating from the frequency range of vibration to be damped, so that the moveable dividing wall 54 (184) and the partition member 48 (183) substantially do not function as a dynamic damper. As will be appreciated from the preceding, it is not essential that the housing that accommodates the moveable plate be elastically supported on the partition member body 50. Nor is it essential that partition member 48 (183) be elastically supported with respect to the second mounting member 14.

In the first and fourth embodiments, the end of the low-frequency orifice passage 100 on the equilibrium chamber 92 side thereof away from the midrange-frequency orifice passage 104 may be utilized to form an additional orifice passage connecting the middle chamber 94 and the equilibrium chamber 92. Similarly, in the second embodiment, the end of the low-frequency orifice passage 100 on the pressure-receiving chamber 90 side thereof away from the midrange-frequency orifice passage 104 may be utilized to form an additional orifice passage connecting the pressure-receiving chamber 90 and the middle chamber 94.

The passage-defining rubber parts 106, 174 may have circular disk shape, oblong plate shape, or the like.

The present invention is not limited to implementation in automotive fluid-filled type vibration damping devices, and may be implemented for example in rolling stock, commercial vehicles, powered two-wheel vehicles, and so on. Additionally, the invention may be implemented in body mounts, member mounts, and various other types of fluid-filled type vibration damping devices besides engine mounts.

KEY TO SYMBOLS

10, 128, 156, 182, 204: automotive engine mount (fluid-filled type vibration damping device); 12: first mounting member; 14: second mounting member; 16: main rubber elastic body; 42: flexible film; 48, 130, 158, 183, 206: partition member; 52: elastic moveable film; 90: pressure-receiving chamber; 92: equilibrium chamber; 94: middle chamber; 100: low-frequency orifice passage; 106, 174, 196: passage-defining rubber part; 111, 175, 198, 208: communication hole; 112, 180: upper valve-like rubber projections (valve body, spring member); 114: upper cushioning projections; 116: lower valve-like rubber projections (valve body, spring member); 118: lower cushioning projections; 122, 170, 192: upper passage holes; 124, 172, 194: lower passage holes; 126, 176, 178, 200, 202, 210: high-frequency orifice passage; 212: rubber plate valves (valve body); 216: plate spring (spring member)

The invention claimed is:

1. A fluid-filled vibration damping device comprising:
a first mounting member and a second mounting member connected by a main rubber elastic body;
a pressure-receiving chamber whose wall is partially constituted by the main rubber elastic body;
an equilibrium chamber whose wall is partially constituted by a flexible film, the pressure-receiving chamber and the equilibrium chamber being filled with a noncompressible fluid;
a partition member partitioning the pressure-receiving chamber and the equilibrium chamber while being supported by the second mounting member;
a low-frequency orifice passage and at least one high-frequency orifice passage tuned to higher frequency than the low-frequency orifice passage, being formed in the partition member for communicating the pressure-receiving chamber and the equilibrium chamber with one another;
at least one valve body disposed at least at one opening of the high-frequency orifice passage, the valve body being provided with a spring member that in a nonloaded state positions the valve body away from the opening of the high-frequency orifice passage to hold the high-frequency orifice passage in an open state, and on a basis of relative pressure fluctuations arising between the pressure-receiving chamber and the equilibrium chamber the valve body being adapted to be urged closer to the opening of the high-frequency orifice passage in opposition to a holding force of the spring member so as to block the high-frequency orifice passage, wherein
the valve body and the spring member are integrally composed by a valve rubber projection that is formed projecting towards at least one of a press-receiving chamber end and an equilibrium chamber end in the opening of the high-frequency orifice passage; and
the partition member includes a passage hole connecting the pressure-receiving chamber and the equilibrium chamber, while supporting a passage-defining rubber part adapted to block the passage hole; the passage-defining rubber part has a communication hole connecting the pressure-receiving chamber with the equilibrium chamber through the passage hole so that the high-frequency orifice passage is constituted by the communication hole; and the valve rubber projection is integrally formed with the passage-defining rubber part at a rim of opening of the communication hole.

2. The fluid-filled vibration damping device according to claim 1, wherein provided is a restricting abutment portion adapted to restrict elastic deformation of the valve rubber projection to a reverse direction to a direction closer towards the opening of the high-frequency orifice passage.

3. The fluid-filled vibration damping device according to claim 1, wherein the at least one high-frequency orifice passage comprises a plurality of high-frequency orifice passages, and each of the plurality of high-frequency orifice passages is provided with the valve body at the opening thereof.

4. The fluid-filled vibration damping device according to claim 3, wherein the plurality of high-frequency orifice passages are tuned to two or more different frequencies.

5. The fluid-filled vibration damping device according to claim 1, wherein the at least one valve body comprises a plurality of valve bodies, and the valve bodies are provided to both an opening at a pressure-receiving chamber end and an opening at an equilibrium chamber end of the high-frequency orifice passage.

6. The fluid-filled vibration damping device according to claim 3, wherein the at least one valve body comprises a plurality of valve bodies, and the valve bodies are adapted to block the high-frequency orifice passages under mutually different conditions.

7. The fluid-filled vibration damping device according to claim 6, wherein the valve bodies are elastically positioned and held by the independent spring members respectively; and the valve bodies are adapted to block the high-frequency orifice passages under mutually different conditions, through tuning of these spring members to mutually different spring constants.

8. The fluid-filled vibration damping device according to claim 1, wherein a cushioning projection is formed in an opening section of the high-frequency orifice passage, adapted to abutment with the valve body.

9. A fluid-filled vibration damping device comprising:
a first mounting member and a second mounting member connected by a main rubber elastic body;
a pressure-receiving chamber whose wall is partially constituted by the main rubber elastic body;
an equilibrium chamber whose wall is partially constituted by a flexible film, the pressure-receiving chamber and the equilibrium chamber being filled with a noncompressible fluid;
a partition member partitioning the pressure-receiving chamber and the equilibrium chamber while being supported by the second mounting member;
a low-frequency orifice passage and at least one high-frequency orifice passage tuned to higher frequency than the low-frequency orifice passage, being formed in the partition member for communicating the pressure-receiving chamber and the equilibrium chamber with one another; and
at least one valve body disposed at least at one opening of the high-frequency orifice passage, the valve body being provided with a spring member that in a nonloaded state positions the valve body away from the opening of the high-frequency orifice passage to hold the high-frequency orifice passage in an open state, and on a basis of relative pressure fluctuations arising between the pressure-receiving chamber and the equilibrium chamber the valve body being adapted to be urged closer to the opening of the high-frequency orifice passage in opposition to a holding force of the spring member so as to block the high-frequency orifice passage, wherein:
the second mounting member is tubular in shape; the first mounting member is positioned spaced apart from an opening at one side of the second mounting member, with a fastening member for fastening the second mounting member to a damped component disposed at an opening at an opposite side of the second mounting member from the first mounting member,
the pressure-receiving chamber is defined to a first mounting member side of the partition member in an axial direction of the second mounting member, and the equilibrium chamber is defined to an opposite side thereof,
a middle chamber is defined in an interior of the partition member, and an elastic moveable film is positioned between the middle chamber and the pressure-receiving chamber,
the high-frequency orifice passage is formed in the partition member so as to connect the middle chamber and the equilibrium chamber through a dividing wall section thereof that divides the middle chamber and the equilibrium chamber, and
the valve body is situated in an opening section of the high-frequency orifice passage so that, in relation to the elastic moveable film in the axial direction of the second mounting member, the valve body is situated at the opening of the second mounting member at the side thereof where the fastening member for fastening to the damped component is disposed.

\* \* \* \* \*